(12) United States Patent
Stevens et al.

(10) Patent No.: US 11,402,964 B1
(45) Date of Patent: Aug. 2, 2022

(54) INTEGRATING ARTIFICIAL REALITY AND OTHER COMPUTING DEVICES

(71) Applicant: Facebook Technologies, LLC, Menlo Park, CA (US)

(72) Inventors: Jasper Stevens, London (GB); Alexander Michael Louie, Milpitas, CA (US); Michal Hlavac, Seattle, WA (US); Benjamin Taylor Koga-Winn, Vancouver, WA (US); Wai Leong Chak, London (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/170,839

(22) Filed: Feb. 8, 2021

(51) Int. Cl.
*G06F 3/04815* (2022.01)
*G06F 3/01* (2006.01)
*G06T 19/00* (2011.01)
*G06F 16/955* (2019.01)
*G06F 3/0486* (2013.01)

(52) U.S. Cl.
CPC .......... *G06F 3/04815* (2013.01); *G06F 3/017* (2013.01); *G06F 3/0486* (2013.01); *G06F 16/9558* (2019.01); *G06T 19/006* (2013.01)

(58) Field of Classification Search
None
See application file for complete search history.

(56) References Cited

U.S. PATENT DOCUMENTS

| | | | |
|---|---|---|---|
| 9,977,493 B2 * | 5/2018 | Lanier | H04N 5/335 |
| 10,068,378 B2 * | 9/2018 | Cabanier | G06T 3/40 |
| 10,268,433 B2 * | 4/2019 | Shibata | G02B 27/0172 |
| 10,430,559 B2 * | 10/2019 | Anantharaman | G06F 21/10 |
| 10,445,936 B1 * | 10/2019 | Charlton | G06T 19/20 |
| 10,743,124 B1 * | 8/2020 | Nelson | H04R 1/1083 |
| 11,049,322 B2 * | 6/2021 | Reynolds | G06T 11/60 |
| 2011/0187743 A1 * | 8/2011 | Hwang | G06K 9/00671 |
| | | | 345/633 |
| 2013/0147686 A1 | 6/2013 | Clavin et al. | |
| 2013/0187835 A1 | 7/2013 | Vaught et al. | |
| 2014/0237366 A1 | 8/2014 | Poulos et al. | |
| 2014/0310056 A1 * | 10/2014 | Alapati | G06K 9/00671 |
| | | | 705/7.28 |

(Continued)

OTHER PUBLICATIONS

Invitation to Pay Additional Fees for International Application No. PCT/US2022/014132, dated Apr. 14, 2022, 11 pages.

*Primary Examiner* — David H Chu
(74) *Attorney, Agent, or Firm* — Potomac Law Group, PLLC

(57) ABSTRACT

Methods and systems for integrating functionality of XR devices and non-XR devices are disclosed herein. An XR device can identify and obtain one or more content items being displayed on non-XR devices and create virtual objects associated with the content item in an artificial reality environment of the XR device. A user of the XR device can interact with the virtual objects, such as by moving the virtual objects to new locations within the artificial reality environment or interact with the virtual objects to view the content items. The user of the XR device can also provide one or more gestures or commands to send content items or identifiers of content items associated with the virtual objects to non-XR devices for display at the non-XR devices.

18 Claims, 20 Drawing Sheets

(56) References Cited

U.S. PATENT DOCUMENTS

| | | | |
|---|---|---|---|
| 2015/0070347 A1* | 3/2015 | Hofmann | G06T 19/006 |
| | | | 345/419 |
| 2015/0348322 A1* | 12/2015 | Ligameri | G06F 3/013 |
| | | | 345/633 |
| 2016/0070742 A1* | 3/2016 | Myslinski | G06F 40/30 |
| | | | 707/690 |
| 2016/0171773 A1* | 6/2016 | Hara | G06T 19/006 |
| | | | 345/633 |
| 2018/0203579 A1* | 7/2018 | Green | G06K 9/2063 |
| 2019/0043447 A1 | 2/2019 | Chung et al. | |
| 2019/0188450 A1* | 6/2019 | Spivack | G06K 9/00201 |
| 2019/0304192 A1* | 10/2019 | Waye | G06F 16/434 |
| 2019/0339831 A1* | 11/2019 | Kobayashi | G06F 3/0484 |
| 2020/0026352 A1* | 1/2020 | Wang | G06F 3/017 |
| 2020/0051337 A1* | 2/2020 | Reynolds | H04N 13/128 |

* cited by examiner

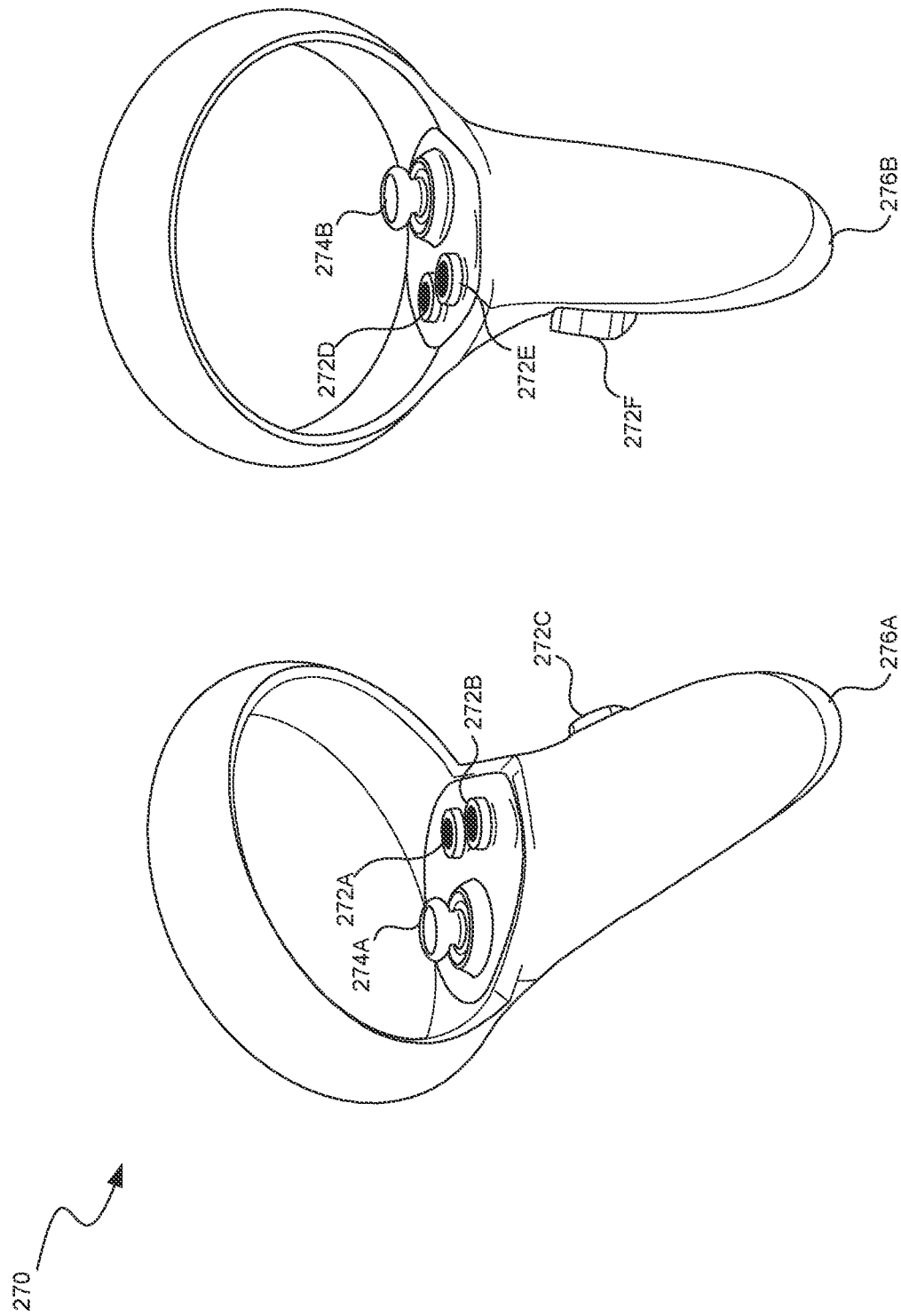

ial reality environment on the XR device. More details regarding the displaying of virtual objects representing content items identifiers in an artificial reality environment are below in relation to FIG. 7.

INTEGRATING ARTIFICIAL REALITY AND OTHER COMPUTING DEVICES

TECHNICAL FIELD

The present disclosure is directed to integrating operation of virtual reality devices with other, non-virtual reality computing devices.

BACKGROUND

Artificial reality systems provide an artificial reality (AR) environment, allowing users the ability to experience different worlds, learn in new ways, and make better connections with others. Devices such as head-mounted displays (e.g., smart glasses, VR/AR headsets), mobile devices (e.g., smartphones, tablets), projection systems, "cave" systems, or other computing systems can present an artificial reality environment to the user, who can interact with virtual objects in the environment using body gestures and/or controllers. These artificial virtual reality systems can track user movements and translate them into interactions with "virtual objects" (i.e., computer-generated object representations appearing in a virtual environment.) For example, an artificial reality system can track a user's hands, translating a grab gesture as picking up a virtual object. A user can select, move, scale/resize, skew, rotate, change colors/textures/skins of, or apply any other imaginable action to a virtual object. While a user is seeing and interacting with virtual objects, the user's physical movements occur in the real world. Some of the objects that a user can also interact with are real (real-world) objects, which exist independently of the computer system controlling the artificial reality environment. For example, a user can select a real object and add a virtual overlay to change the way the object appears in the environment (e.g., color, texture), select a real object and be shown a virtual user interface next to the object to interact with it, or cause other interactions with virtual objects. As used herein, unless otherwise specified, an "object" can be a real or virtual object.

BRIEF DESCRIPTION OF THE DRAWINGS

FIG. 2C illustrates controllers, which, in some implementations, a user can hold in one or both hands to interact with an artificial reality environment.

The techniques introduced here may be better understood by referring to the following Detailed Description in conjunction with the accompanying drawings, in which like reference numerals indicate identical or functionally similar elements.

DETAILED DESCRIPTION

Figure 1:
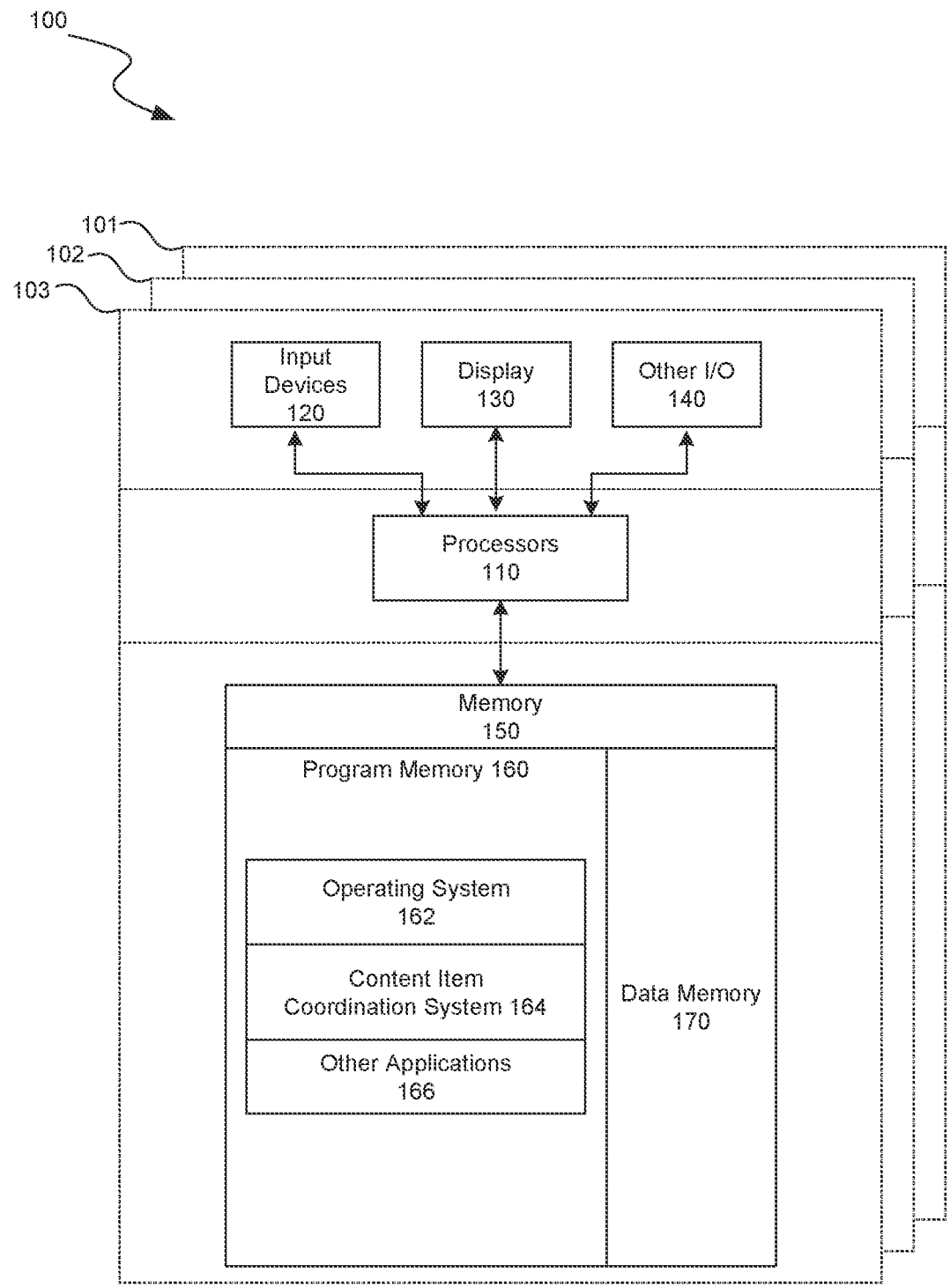
FIG. 1 is a block diagram illustrating an overview of devices on which some implementations of the present technology can operate.

Aspects of the present disclosure are directed to a content item coordination system that can integrate the use of artificial reality devices (XR devices) with other (e.g., non-artificial reality or "non-XR") computing devices, allowing content items to be shared between XR devices and non-artificial reality devices. There are a variety of circumstances under which a user may wish to access various content items without requiring deactivation of the XR device or removal of the XR device. For example, an XR device user may wish to access content items, such as news articles, videos, audio files, and other content items on non-virtual reality devices. To do this, a user normally would be required to turn off the XR device or remove the XR device to interact with the non-virtual reality devices. However, the content item coordination system can setup communication channels between these devices over which these devices can share content items without the user having to switch devices.

In one example, a non-artificial reality device can be registered with an XR device for later communication. Discovery, either manually triggered or automatic, between the XR device and non-artificial reality device can initiate a registration process. This registration process can create a communication channel between the devices. After the registration process is complete, the XR device begins tracking the registered non-artificial reality device. More details regarding the registration process can be found below in relation to FIG. 5.

In another example, an XR device can identify a user selection of a non-artificial reality device. One or more content items from the selected non-artificial reality device are then identified and accessed by the XR device. The XR device then creates virtual objects representing the one or more content items and displays the virtual objects in an artificial reality environment. More details regarding the displaying of virtual objects representing content items in an artificial reality environment are below in relation to FIG. 6.

In yet another example, an XR device can identify a user selection of a non-artificial reality device. One or more content item identifiers from the non-artificial reality device can be obtained by the XR device. Using the content item identifiers, the XR device can obtain the corresponding content items and create virtual objects representing the content items and display the virtual objects in the artificial reality environment. Additional details regarding identifying content item identifiers, retrieving the content items, and displaying corresponding virtual objects in an artificial reality environment are provided below in relation to FIG. 7.

In a further example, an XR device can identify a user selection of a virtual object being displayed in an artificial reality environment. The XR device can also identify a user selection of a non-artificial reality device in the artificial reality environment. The XR device can send a content item or an identifier of the content item associated with the selected virtual object to the non-artificial reality device. The non-artificial reality device can then display the content item associated with the identifier. Additional details on transferring content items from an XR device to a non-artificial reality device are provided below in relation to FIG. 8.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. As used herein, while some devices such as smart phones have the capability to be augmented reality devices, they fit within the category of non-artificial reality devices when these capabilities are not being used. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR systems require users to manually share content between the XR device and other devices (e.g., through file sharing apps, email, etc.). This results in persistent user switching between devices and often the inability of users to access some content across devices. The content item coordination system and processes disclosed herein are expected to overcome these problems with existing XR systems by integrating content item sharing between XR systems and non-XR devices. By enabling communications of content items between the XR device and the non-XR devices, users can quickly and efficiently access content items on a variety of devices without needing to manually share the content item with each individual device. Furthermore, a user of an XR system is no longer required to remove the XR system or deactivate the XR system to interact with non-XR devices. Instead, the XR device user can access content items that are displayed on non-XR devices by selecting, via the XR device, content items on the non-XR device. In response to the user selection, content items are provided to the XR device, which then creates virtual objects associated with the content items in the artificial reality environment. Furthermore, an XR device user can perform a gesture to interact with a virtual object and "drag and drop" a virtual object to a non-XR device (or otherwise instruct the XR device to share content to a non-XR device) in the artificial reality environment. In response, the XR device can send the content item or an identifier of a content item to the non-XR device, which then can display the content item. In this manner, a user can perform sharing actions in the XRE without having to manually move content items between devices.

Several implementations are discussed below in more detail in reference to the figures. FIG. 1 is a block diagram illustrating an overview of devices on which some implementations of the disclosed technology can operate. The devices can comprise hardware components of a computing system 100 that responds to commands via an XR device to share content items between the XR device and non-artificial reality devices, both to pull content items from the non-XR device into an XRE and cause the non-XR device to automatically display content items shared from the XRE. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, content item coordination system 164, and other application programs 166. Memory 150 can also include data memory 170 that can include data for presenting an artificial reality environment and virtual objects within the environment to a user, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
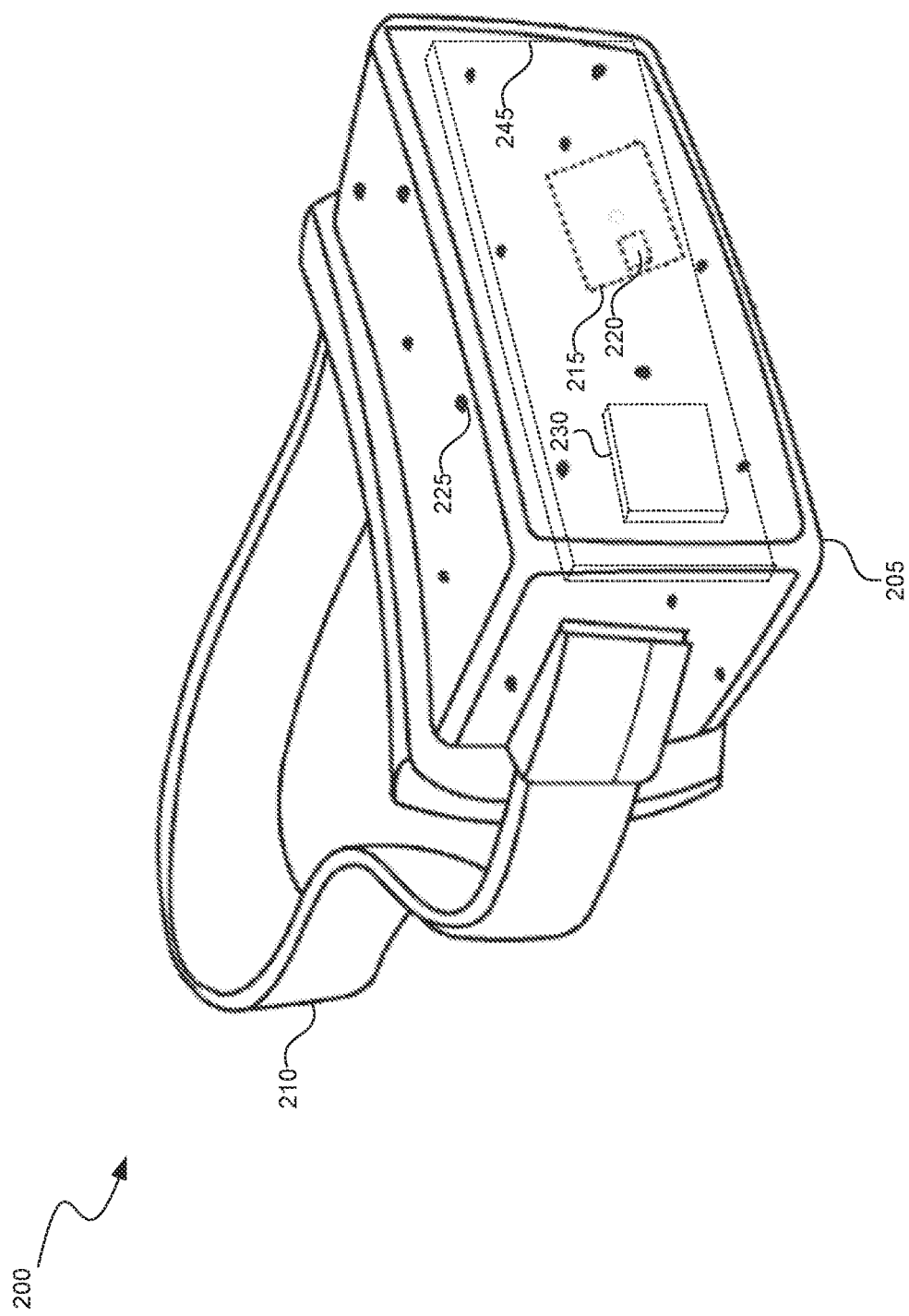
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
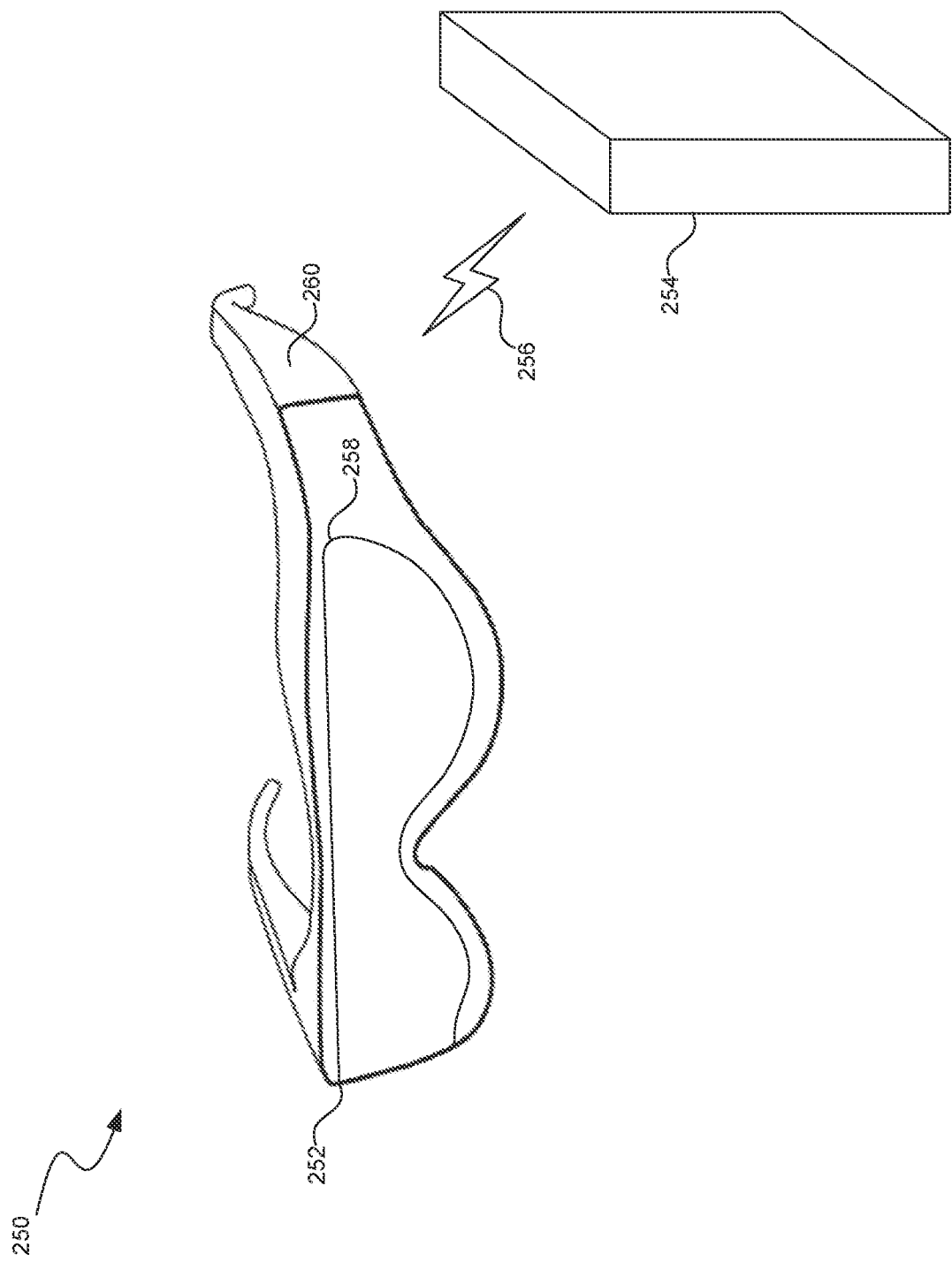
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
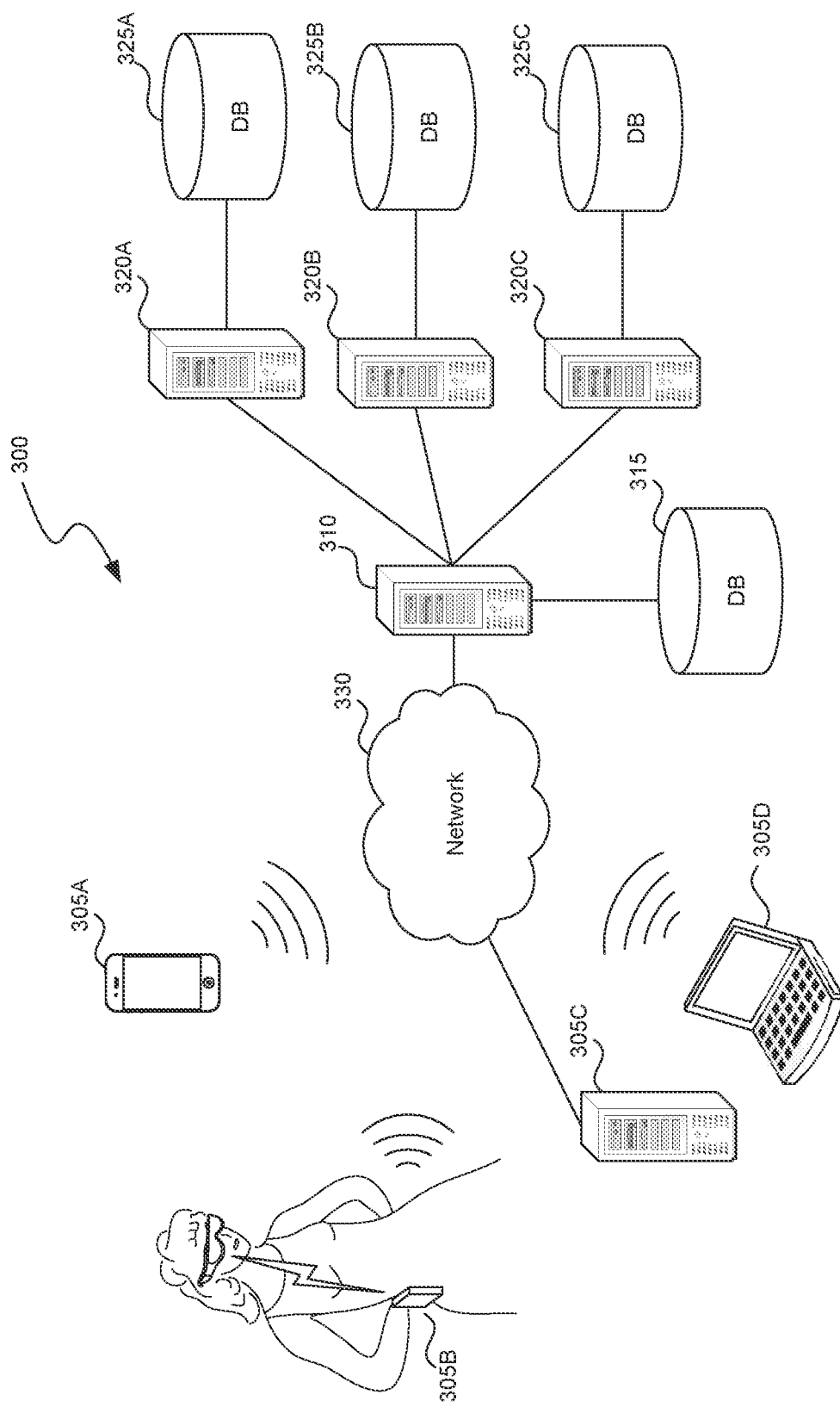
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
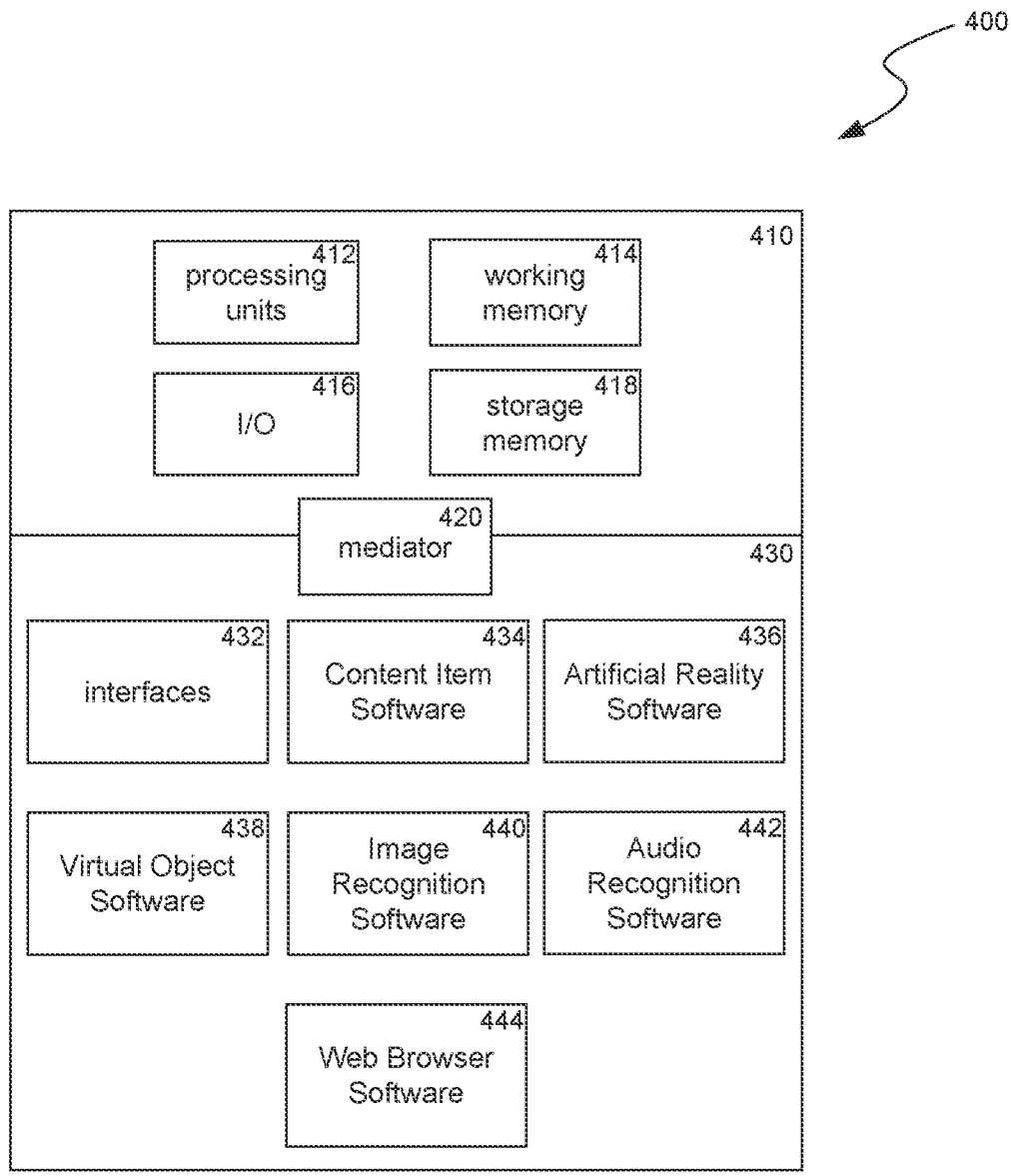
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for integrating XR device functionality with non-XR device functionality. Specialized components 430 can include content item software 434, artificial reality environment software 436, virtual object software 438, image and object recognition software 440, audio recognition software 442, web browser software 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. For example, different instances of one of more of the specialized components 430 can be in an XR device and a non-XR device. Although depicted as separate components, specialized components 430 may be logical or other nonphysical differentiations of functions and/or may be submodules or code-blocks of one or more applications.

Content item software 434 allows a device to access and interact with content items. For example, content item software 434 can display content items, such as videos, news articles, video calls, photos, social media posts, files, documents, songs, and the like. Content item software 434 can, for example, perform playback of a video or a song, allow a user to read a news article, view a photo, social media post, or document, and the like. More details regarding content items and the use of content items can be found below in relation to block 604 of FIG. 6, block 704 of FIG. 7, and block 806 of FIG. 8.

Artificial reality environment software 436 allows an XR device to create, display, and manipulate an artificial reality environment. For example, the artificial reality environment can include a three-dimensional space that a user of the XR device can interact with, such as viewing virtual reality objects, backgrounds, scenes, and the like. The user can interact with these objects, backgrounds, and scenes to manipulate the objects, background, and scenes. The artificial reality environment software 436 can also be used to detect and track user movements in the artificial reality environment, such as detecting user gestures. More details regarding the artificial reality environment can be found below in relation to block 608 of FIG. 6, block 708 of FIG. 7, and block 802 of FIG. 8.

Virtual object software 438 allows an XR device to create virtual objects for display in the artificial reality environment. For example, virtual object software 438 can coordinate with content items software 434 to create virtual objects representing content items, such as an icon representing a news article, a 2D panel with a picture, social media post, or video, 3D models, etc. These virtual objects can then be displayed within the artificial reality environment. A user of the XR device can interact with the objects. For example, the user can perform a gesture to select an object or move an object around in the artificial reality environment. More details regarding the virtual objects can be found below in relation to block 606 of FIG. 6, block 706 of FIG. 7, and block 802 of FIG. 8.

Image and object recognition software 440 can perform image and object recognition in the artificial reality environment. For example, image and object recognition software 440 can be used to identify, for example, a display of a non-XR device, a displayed content item on the display of the non-XR device, a hand of the user of the XR device, and the like. Based on recognized images and objects, the XR device can identify content items, non-XR devices, user gestures, obstructions in the artificial reality environment, and the like. More details regarding image and object recognition can be found be found below in relation to block 506 of FIG. 5, block 602 of FIG. 6, block 702 of FIG. 7, and blocks 802 and 804 of Figure.

Audio recognition software 442 can be used to recognize when audio is being output by a user (e.g., a voice command), a non-XR device, or another audio source. The audio recognition software 442 can identify what audio is being output, such as a voice command, a song, a live television program, a voice call, and the like. In some implementations, the audio recognition software 442 can identify when audio is being output and what is being output and then transmit a command to the visual object software 438, which can create a virtual object indicating that an audio source is outputting audio. The virtual object software 438 can then place the virtual object next to the audio source in the artificial reality environment. More details regarding audio recognition can be found below in relation to block 502 of FIG. 5 and block 704 of FIG. 7.

Web browser software 444 allows a user of the XR device to access web pages hosted on the Internet. In some implementations, the web browser software 444 can be used to access content via one or more received content identifiers, such as hyperlinks to web pages. More details regarding the web browser software 444 being used to access content items can be found below in relation to block 806 of FIG. 8.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
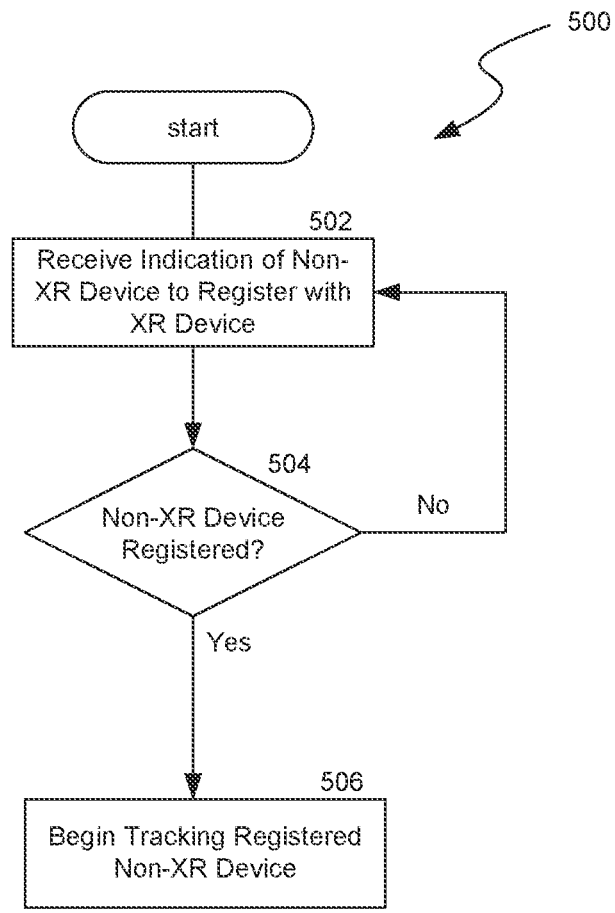
FIG. 5 is a flow diagram illustrating a process used in some implementations of the present technology for registering a non-XR device with an XR device

FIG. 5 is a flow diagram illustrating a process 500 used in some implementations for registering a non-XR device with an XR device. In some implementations, process 500 can be performed as a response to: a user request to register the non-XR device with the XR device or vice versa, automatically upon the XR device and non-XR device being within communication range, when a user add a device to her account (e.g., uses a common profile to sign-in to the device), or when the non-XR device is activated, the XR device is activated, or both are activated.

At block 502, the XR device receives an indication of the non-XR device to register with the XR device. Registration of the non-XR device can be triggered in a variety of ways. In some implementations, registration can be triggered in response to the XR device and the non-XR device being detected by the XR device to be on the same communication network, such as the same Wi-Fi connection, the same local area network, the same wide area network, the same near-field communication network, the same wired connection, and the like. In other implementations, registration occurs when the XR device detects a broadcasted signal from the non-XR device, such as detecting a Bluetooth™ signal or other broadcasted signal from the non-XR device.

In further implementations, registration can be triggered in response to the XR device and the non-XR device sharing a social media software application in which a shared user is logged on. For example, the XR device and non-XR device can have the same social media software application downloaded to a memory associated with each device. The social media software application can include user profile functionality, which allows a user to create a unique user profile for themselves in the social media software application. The non-XR device can broadcast a signal in response to activation of the non-XR device or another actuation of the non-XR device, such as a user pressing a button or other input mechanism of the non-XR device to initiate the signal broadcast. The signal can include identifying information of the unique user profile, such as a username, email address, password, unique user identification number, and the like. The identifying information of the unique user profile can then be compared to the identifying information of the unique user profile associated with the social media software application in the memory of the XR device. If the same unique user profile is present on the XR device and the non-XR device, registration is triggered.

In other implementations, registration can be triggered in response to a communication connection being established between the XR device and the non-XR device. For example, a direct communication connection can be established between the XR device and the non-XR device, such as a Wi-Fi connection or near field communication connection. In another example, a third party device can be used to establish the communication connection, such as a server. In this example, the XR device and the non-XR device communicate with the server, which passes messages and data in between the XR device and the non-XR device.

In some implementations, registration can be triggered using a communication software application. For example, the XR device and the non-XR device can store the communication software application in memory. Permissions within the communication software application can then be enabled for the XR device and non-XR device. The permissions can enable the devices to send commands and receive commands from each other device over, for example, a wireless communication connection.

In some implementations, registration can be triggered by the XR device detecting a registration code (e.g., alpha-numeric sequence, bar code, QR code, etc.) being displayed by the non-XR device. For example, the non-XR device may display a registration code on a display. The XR device can detect the registration code being displayed using a computer vision system, match the code to a device identifier, and initiate the registration process with that device. In some implementations, instead of the XR device detecting the registration code, a user can manually enter registration code from the non-XR device into the XR device or vice-versa.

In some implementations, the non-XR device can broadcast a signal to all XR devices in the vicinity of the non-XR device. The signal can be received by the XR device which can cause a registration to begin or can cause the XR device to display a virtual object. The virtual object can include a registration code or link, such as a uniform resource locator ("URL"). When the virtual object is selected by a user of the XR device, the registration process can be initiated.

In some implementations, the registration process can cause the non-XR device to display content items with a corresponding code or link recognizable by the XR device. For example, due to the registration the non-XR device can detect that the XR device is in the vicinity and in response can display certain content items with a content item code (e.g., alpha-numeric sequence, bar code, QR code, etc.) identifying the content item and/or a source for where to retrieve the content item. When the user selects a content item, the XR device can recognize the corresponding displayed content item code, retrieve the content item, and create a corresponding virtual object. More details regarding these codes and/or links can be found below in relation to FIG. 7.

The registration process can include, in some implementations, storing identifying information of the non-XR device in a memory of the XR device and vice versa. The registration process can also include establishing a communication channel between the XR device and non-XR device (e.g., storing communication information in memories associated with each device to enable communications between the devices). For example, such a communication channel can be for communication over WiFi, Bluetooth, the Internet or other local or wide-area network. In some implementations, the registration can include installing an application or other software module on either or both of the XR or non-XR device, enabling that device to respond to received content items (e.g., displaying them on a screen, outputting their sound, creating corresponding virtual objects, etc.) In some implementations, the registration can include setting permissions on either or both of the XR or non-XR device, permitting the application that receives shared content items to output them.

At decision block 504, the process 500 waits for the registration process to occur. While the registration process is not complete ("No" at decision block 504), the process 500 waits. At block 506, and after the registration process is complete ("Yes" at decision block 504), the process 500 begins tracking the registered non-XR device using the XR device. In some implementations, the non-XR device is tracked via a communication connection between the non-XR device and the XR device, as discussed above. As an example, some non-XR devices may be able to track their own location and can report this location to the XR device. As another example, during the registration process, the XR device can be provided with an image or identification of the non-XR device (from the non-XR device, from a repository based on the identification of the non-XR device, or one or more images of the non-XR device can be captured by the XR device.) In some cases, the system can instruct the user on how to position the XR device and non-XR device to capture the image(s) of the non-XR device for tracking. The XR device can then use the image to track the non-XR device using, for example, existing object recognition and tracking techniques. In another implementation, the non-XR device can emit a certain light configuration that can be tracked by the XR device in the artificial reality environment. The light configuration can be an inferred light output by specialized hardware, a light pattern on a display, a Quick Response ("QR") code, a pattern of blinking light-emitting diodes ("LED"), and the like. The XR device can detect the light configuration in the artificial reality environment to determine a position of the non-XR device. Using the determined position, the XR device can identify the non-XR device and track the non-XR device. Tracking the position of the non-XR device allow the XR device to interpret commands in relation to the non-XR device such as commands to retrieve content items displayed by the non-XR device (as discussed below in relation to FIGS. 6 and 7) or commands to transfer content items to the non-XR device (as discussed below in relation to FIG. 8).

Figure 6:
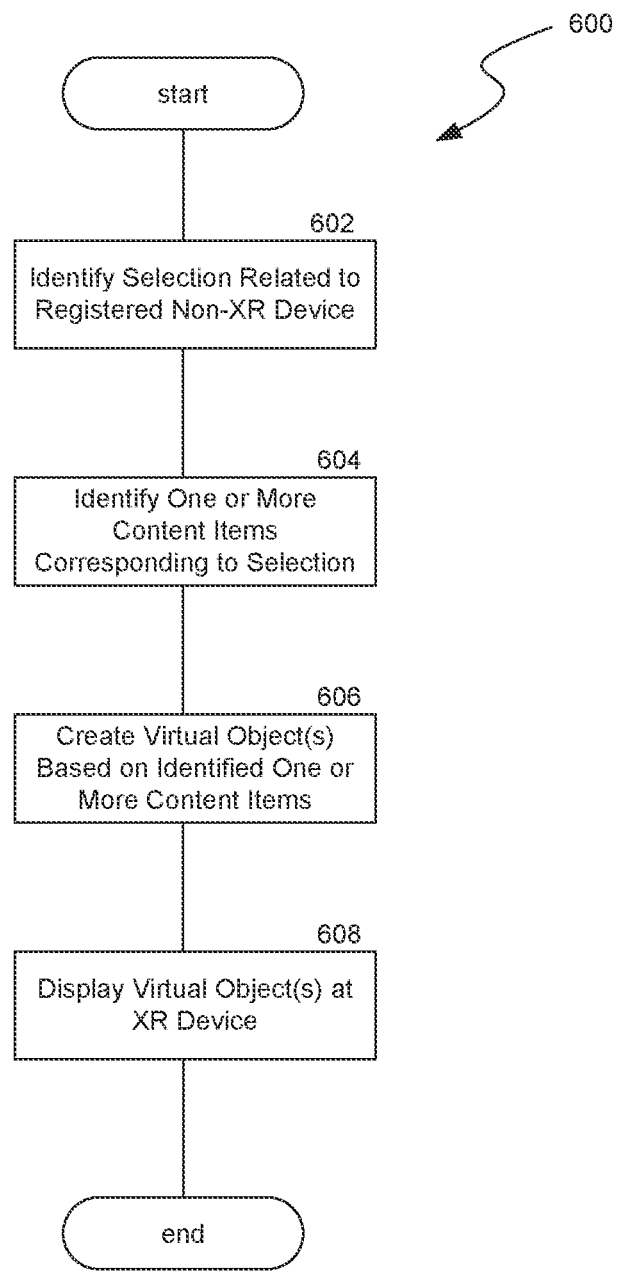
FIG. 6 is a flow diagram illustrating a process used in some implementations of the present technology for displaying a virtual object in an artificial reality environment on an XR device.

FIG. 6 is a flow diagram illustrating a process 600 used in some implementations for displaying a virtual object in an artificial reality environment on an XR device. In some implementations, process 600 can be initiated on start-up of the XR device or in response to a registration of a non-XR device with the XR device. Process 600 can then run "in the background" until a triggering condition is detected, such as identifying a selection of the non-XR device as described below. Once the triggering condition is detected, the process 600 executes.

At block 602, the XR device recognizes a selection related to a non-XR device registered with the XR device. This can be a selection for a content item the non-XR device is outputting (identifying which content item is intended is discussed below in relation to block 604, once the device is identified at block 602). In some implementations, the selection can be a gesture of the user and can be recognized by the XR device using image recognition or object recognition to detect the gesture. For example, the gesture can be a user pointing a virtual ray at an object, such as extending a hand with an open palm towards the non-XR device. The virtual ray can be generated by, for example, a user pointing a finger at the non-XR device or pointing a closed first at the non-XR device. In some implementations, the detected gesture can be an "air tap," or a user making a tapping motion in the direction of the non-XR device.

In some implementations, the selection is detected using a voice command. For example, the user of the XR device may recite "select the video being played on My Streaming Device" to select a video content item currently being output by the non-XR device with an identifier (e.g., a device name or unique identifying code) of "My Streaming Device."

In some implementations, the non-XR device is outputting audio, such as playing a song. The XR device can detect that the non-XR device is outputting audio and can create a virtual object for display in the artificial reality environment indicating that the non-XR device is outputting audio. The virtual object can be displayed in the artificial reality environment in proximity to the non-XR device. The user of the XR device can then perform the selection identified at block 602 by selecting the virtual object, such as by performing a gesture to "grab" the virtual object or point at the virtual object, to select the non-XR device. In other implementations, the user of the XR device can select an audio content item by selecting a speaker of the non-XR device by, for example, gesturing at the speaker. When the speaker is selected, the audio being output by the non-XR device can be selected.

In some implementations, block 602 is only performed in response to a prompt by the user. For example, the user can activate a selection mode before selections are identified. This allows the user to work normally in the artificial reality environment until the user wishes to select the non-XR device. In response to a triggering condition, such as a voice command or an actuation of a button or other mechanism on the XR device, the XR device identifies the selection in relation to the non-XR device.

At block 604, process 600 identifies one or more content items corresponding to the selection of the non-XR device. In some implementations, a communication channel set up during the registration of the non-XR device with the XR device (as described in relation to FIG. 5) is identified. The communication channel can be a direct communication channel between the non-XR device and the XR device, such as a near-field communication channel. The XR device can use this communication channel to request the non-XR device provide a current content item it is outputting. For example, the XR device can receive a currently displayed content item on the non-XR device as the identified content item. In another example, the non-XR device can determine a most centrally displayed content item (e.g., a content item that is closest to the center of the display) and send the centrally displayed content item to the XR device as the identified content item.

In some implementations, the XR device can determine a location of the selection. For example, the XR device can determine a location of an endpoint of a gesture used to select the non-XR device. The location of the endpoint is a location within the artificial reality environment being presented to the user of the XR device. The location of the endpoint can then be translated by the XR device into a location on a display associated with the non-XR device. The location of the endpoint is translated by determining dimensions of the display within the artificial reality environment. After the dimensions of the screen are determined, one or more offsets of the location of the endpoint with respect to the dimensions are determined. For example, the XR device determines that the location of the endpoint within the artificial reality environment is offset by an X and Y amount from an upper left corner of the display of the non-XR device The XR device can provide these offsets to the non-XR device, requesting that the non-XR device provide an indication of the content item displayed at those coordinates. The non-XR device can provide the content item located at the corresponding point on the display of the non-XR device or an identifier for that content item for the XR device to retrieve from another source.

In some implementations, one or more content items can be embedded within other content items. For example, a social media post content item can include a comment content item, which can include a photo content item, etc. If the point on the display corresponding to the location of the endpoint of the gesture includes one or more embedded content items, a hierarchy of content items and/or one or more rules can be used by the non-XR device to determine which content item(s) to select. The hierarchy of content items and the one or more rules define how content items should be selected. For example, the hierarchy of content items can define a default level at which content items should be selected, such as the content item that is embedded at the lowest level or the content item at the highest level containing embedded content items. While the hierarchy can be based on which content item is included inside which other content item, in other implementations, the hierarchy can be defined in terms of content item types. Thus, any set of overlapping content items can be arranged according to a defined hierarchy of the types of those content items. For example, where a selection is for a point that is on the social media post content item that includes the comment content item, that includes the photo content item, the non-XR device can use a hierarchy defining comment<photo<social media post. The non-XR device then can select the comment as the highest content item from this arrangement.

In some implementations, the user of the XR device, using a gesture, can control how embedded content items are accessed. For example, the user can continue to hold the gesture used to select the XR device. While the user is holding the gesture (e.g., continuing to hold out a hand), the XR device can continue to "drill down" into the embedded content items, highlighting content items at ever deeper levels of embedded content items while the gesture is held, until the user releases the gesture to select the highlighted content item. In another example, one content item can contain a plurality of embedded content items. While the gesture is held, each of the embedded content items can be highlighted in turn by the user of the XR device. The user of the XR device can then select content item(s) as each content item is highlighted. In some implementations, the user of the XR device can perform an additional gesture to access embedded content items. For example, the user of the XR device can use a swiping gesture to select different levels of embedded content items or view each content item of a plurality of embedded content items in succession. In some implementations, the XR device can display overlays in the artificial reality environment indicating which content item on the display is currently indicated for selection. For example, a white outline can be displayed around the indicated content item or a semi-transparent display element can be displayed over the indicated content item. Additional details regarding block 604 can be found below in relation to FIG. 9A.

At block 606, process 600 creates a virtual object for each content item identified in block 604. The virtual object associated with each content item is a visual representation of the content item to be displayed in the artificial reality environment. For example, if the identified content item is a calendar, a graphic of a calendar, (e.g., a display of days of the month), is created. In another example, the identified content item can be a video. The virtual object created to represent the video can be a large "play" button, a still image taken from a frame of the video, a panel playing the video, a 3D environment created based on the video (e.g., using machine learning and perspective information determined between frames to convert the 2D video to 3D), etc. In yet another example, the identified content item can be a news article and the virtual object created to represent the news article can include a screenshot of the title of the article, an image associated with the article, a 2D panel displaying the article, etc. In some implementations, instead of creating a virtual object, the content item can be output by the XR device, such as by playing an audio content item via speakers of the XR device.

In some implementations, the virtual object can include additional information. Continuing the previous example, in addition to displaying the article and an image associated with the article, the virtual object associated with a news article can also include a link to the article, which allows the user of the XR device to access the article for viewing online using a web browser software application.

In some implementations, identifying the content item at block 604, instead of receiving the content item from the non-XR device, the non-XR device can provide a content item identifier. The XR device can then retrieve the content item to before creating the corresponding virtual object. For example, the XR device may have a default location (or set of location to search) from which to retrieve content items. For example, content item identifiers can be provided as identifiers of nodes in the social graph, keys into a database from which the XR device retrieves the content item. In some implementations, the content item identifier can specify a source, such as by including a link or URI, telling the XR device from where to retrieve the content item.

At block 608, process 600 displays the virtual object(s) created for each content item in the artificial reality environment of the XR device (or otherwise outputs the content item). Each virtual object is displayed in the artificial reality environment and can be interacted with by the user. For example, the user of the XR device can perform a gesture to "grab" or "touch" the virtual object. In response to the gesture, the XR device can, for example, open a news article associated with the virtual object in a web browser software application on the XR device. In another example, if the user presses a virtual play button in relation to a video virtual object, the video is displayed in the artificial reality environment and video playback can begin.

In some implementations, the user of the XR device can perform a gesture to move the virtual object after the virtual object is created. For example, when the virtual object is first created, the virtual object can be displayed as a semi-transparent object at the same location as the display of the non-XR device in the artificial reality environment. The user of the XR device can then "grab" the semi-transparent virtual object to move the virtual object to a new location in the artificial reality environment. After the virtual object is moved away from the display of the non-XR device, the virtual object can be displayed as fully opaque, as the virtual object is no longer obscuring the display of the non-XR device.

In some implementations, after the virtual object is displayed in the artificial reality environment, the user of the XR device can perform a gesture to move the virtual object in the artificial reality environment to display the content item associated with the virtual object on a different non-XR device. For example, after the virtual object is created, the user can "drag and drop" the virtual object onto display of a different non-XR device in the artificial reality environment, such as a smart streaming device. The XR device can send an identifier to the smart streaming device of the content item, and the smart streaming device can display the content item associated with the content item identifier, such as a video or a news article. In this manner, the XR device can coordinate sharing between two non-XR devices. Additional details on causing a non-XR device to output a content item are provided below in relation to FIG. 8.

Additional details regarding the XR device output of virtual objects corresponding to content items from a non-XR device can be found below in relation to FIGS. 9A-9C, 10A-10C, and 11A-11D.

Figure 7:
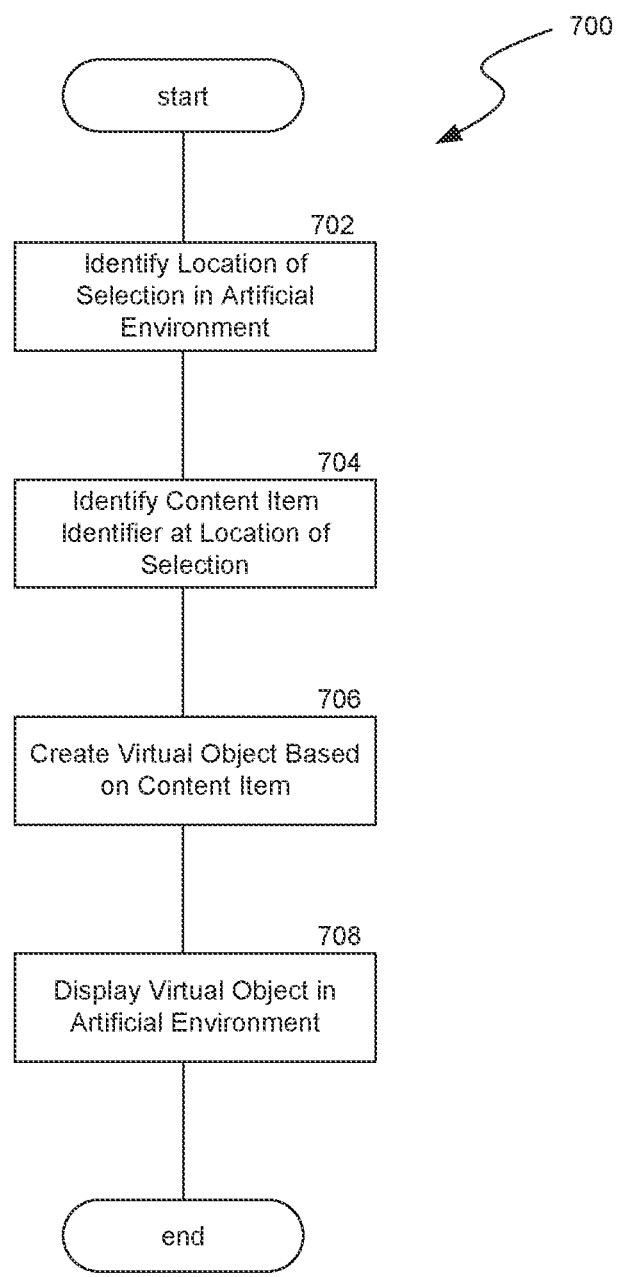
FIG. 7 is a flow diagram illustrating a process used in some implementations of the present technology for displaying a virtual object in an artificial reality environment on an XR device by accessing one or more content item identifiers.

FIG. 7 is a flow diagram illustrating a process 700 used in some implementations for displaying a virtual object in an artificial reality environment on an XR device using one or more content item identifiers. In some implementations, process 700 can be initiated on start-up of the XR device or in response to a registration of a non-XR device with the XR device. Process 700 can then run "in the background" until a triggering condition is detected, such as identifying a selection in relation to the non-XR device as described below. Once the triggering condition is detected, the process 700 executes.

At block 702, process 700 identifies a location of a selection by a user of the XR device in an artificial reality environment of the XR device. This can be a selection for a content item the non-XR device is outputting (identifying which content item is intended is discussed below in relation to block 704, once the device is identified at block 602). For example, the XR device can detect a user gesture within the artificial reality environment, such as a user pointing at a location within the artificial reality environment. An endpoint of the gesture can be identified. For example, the XR device can track movement of a hand of the user in the artificial reality environment. In some implementations, after the movement stops, the XR device can wait for a specified threshold of time (e.g., half of one second) before determining a location of the user's hand in the artificial reality environment as the endpoint of the gesture. In other implementations, the selection can be made when the user performs a particular gestures, such as performing an "air tap" or "pinch" gesture or when the user provides input via another device, e.g., a wristband detecting a selection gestures. In some cases, the selection can be performed without the user's hands, e.g., by tracking the user's gaze and detecting a hover time expiration. By waiting for the hover timer to expire, the proper location of the gaze for selection can be identified. In some implementations, the XR device determines coordinates within the artificial reality environment of the endpoint of the movement. These coordinates can be used to perform, among other things, the remaining steps of process 700.

In some implementations, block 702 is only performed in response to a prompt by the user. For example, the user can activate a selection mode before selections are identified. This allows the user to work normally in the artificial reality environment until the user wishes to select a content item. In response to a triggering condition, such as a voice command or an actuation of a button or other mechanism on the XR device, the XR device identifies the selection of the location in the artificial reality environment.

At block 704, process 700 identifies a content item identifier displayed by the non-XR device at the location relative to the selection. The content item identifier can be a link, such as a URL, or a code that can be used to access a content item. For example, the content item identifier can include a URL that links to a news article or video. In another example, the content item identifier can be a QR code or a different type of computer-readable code. In a further example, the content item identifier can be an entry in a database, a link to the database entry, a code to access a database, and the like. In some implementations, the non-XR device can display the content item identifier on a display screen of the non-XR device and the XR device can identify the content item being displayed on the screen. For example, the XR device can use text recognition algorithms or object recognition algorithms to identify the displayed content item identifier on the screen. The XR device can then identify the content item identifier being displayed. The non-XR device can display content item identifiers on some or all content items it outputs as a result of a registration process as discussed above in relation to FIG. 5.

In some implementations, the non-XR device can provide a content item identifier to the XR device as audio output. For example, the non-XR device can output an automated sentence providing a title of a content item as the content item identifier. Using voice and/or sound recognition algorithms, the XR device can recognize the content item identifier from the output audio.

The XR device uses any identified content item identifiers to access the related content items. For example, if an identified content item identifier is a URL for a web page, the XR device can access the web page.

In other implementations, the XR device can identify the content item without the non-XR device displaying the content item identifier. The XR device can identify a screen of the non-XR device in relation to the location of the selection and capture images, video, or audio of the output of the non-XR device. The XR device can then use various known search and analysis systems to identify the content item. For example, the XR device can search a social graph for matching social media posts, can search image databases for matching images, can search for matching videos, can search for matching audio files, etc. In some implementations, the XR device can first determine a type of the content item that is output at the location of the selection (e.g., as a social media post, an image, a video, audio, etc.) before performing a search for that type of content item. For example, the XR device can identify certain visual structures as corresponding to social media posts, calendar items, etc., can identify movement as corresponding to a video, can determine a direction of captured audio to determine if it corresponds to the user's selection, etc. In some implementations, a machine learning model can be trained (using these types of signals as input) to classify content items corresponding to a user selection. Once a type is determined, corresponding search processes and search locations can be employed.

In some implementations, one or more content items can be embedded within other content items. For example, a social media post content item can include a comment content item, which can include a photo content item, etc. If the point on the display corresponding to the location of the endpoint of the gesture includes one or more embedded content items, a hierarchy of content items and/or one or more rules can be used by the XR device to determine which content item(s) to select. The hierarchy of content items and the one or more rules define how content items should be selected. For example, the hierarchy of content items can define a default level at which content items should be selected, such as the content item that is embedded at the lowest level or the content item at the highest level containing embedded content items. While the hierarchy can be based on which content item is included inside which other content item, in other implementations, the hierarchy can be defined in terms of content item types. Thus, any set of overlapping content items can be arranged according to a defined hierarchy of the types of those content items. For example, where a selection is for a point that is on the social media post content item that includes the comment content item, that includes the photo content item, the XR device can use a hierarchy defining comment<photo<social media post. The XR device then can select the comment as the highest content item from this arrangement.

At block 706, process 700 creates a virtual object for each content item accessed using the identified content item identifiers. The virtual object associated with content item is a visual representation of the content item to be displayed in the artificial reality environment. For example, if the identified content item is a calendar, a graphic of a calendar, including days of the month, can be created. In another example, the identified content item can be a video and the virtual object created to represent the video can be a large "play" button, a still image taken from a frame of the video, a panel playing the video, a 3D environment created based on the video (e.g., using machine learning and perspective information determined between frames to convert the 2D video to 3D), etc. In yet another example, the identified content item can be a news article and the virtual object created to represent the news article can include a screenshot of the title of the article, an image associated with the article, a 2D panel displaying the article, etc. In some implementations, instead of creating a virtual object, the content item can be output by the XR device, such as by playing an audio content item via speakers of the XR device.

In some implementations, the virtual object can include additional information. For example, in addition to displaying a screenshot of a title of an article and an image associated with the article, a virtual object associated with a news article can also display a link to the article, which allows the user of the XR device to access the article for viewing online using a web browser software application.

At block 708, process 700 displays the virtual object(s) created for each content item in the artificial reality environment of the XR device (or otherwise outputs the content item). Each virtual object is displayed in the artificial reality environment and can be interacted with by the user. For example, the user of the XR device can perform a gesture to "grab" or "touch" the virtual object. In response to the gesture, the XR device can, for example, open a news article associated with the virtual object in a web browser software application on the XR device. In another example, if the user presses a virtual play button in relation to a video virtual object, the video is displayed in the artificial reality environment and video playback can begin.

In some implementations, the user of the XR device can perform a gesture to move the virtual object after the virtual object is created. For example, when the virtual object is first created, the virtual object can be displayed as a semi-transparent object at the same location as the display of the non-XR device in the artificial reality environment. The user of the XR device can then "grab" the semi-transparent virtual object to move the virtual object to a new location in the artificial reality environment. After the virtual object is moved away from the display of the non-XR device, the virtual object can be displayed as fully opaque, as the virtual object is no longer obscuring the display of the non-XR device.

In some implementations, after the virtual object is displayed in the artificial reality environment, the user of the XR device can perform a gesture to move the virtual object in the artificial reality environment to display the content item associated with the virtual object on a different non-XR device. For example, after the virtual object is created, the user can "drag and drop" the virtual object onto display of a different non-XR device in the artificial reality environment, such as a smart streaming device. The XR device can send an identifier to the smart streaming device of the content item, and the smart streaming device can display the content item associated with the content item identifier, such as a video or a news article. In this manner, the XR device can coordinate sharing between two non-XR devices. Additional details on causing a non-XR device to output a content item are provided below in relation to FIG. 8.

Additional details regarding the XR device output of virtual objects corresponding to content items from a non-XR device can be found below in relation to FIGS. 9A-9C, 10A-10C, and 11A-11D.

Figure 8:
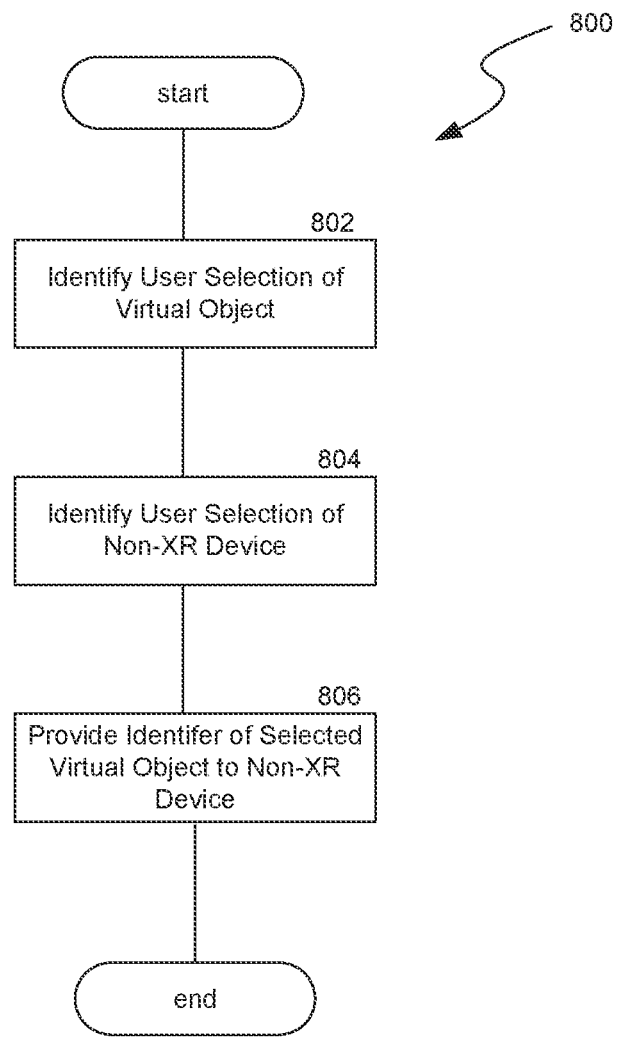
FIG. 8 is a flow diagram illustrating a process used in some implementations of the present technology for displaying a content item on a non-XR device.

FIG. 8 is a flow diagram illustrating a process 800 used in some implementations for displaying a content item on a non-XR device. In some implementations, process 800 can be initiated on start-up of an XR device or in response to a registration of the non-XR device with the XR device. Process 800 can then run "in the background" until a triggering condition is detected, such as identifying a user selection of a virtual object as described below. Once the triggering condition is detected, the process 800 executes.

At block 802, process 800 identifies a selection of a virtual object being displayed in an artificial reality environment of the XR device. The virtual object can relate to a content item such as a calendar item, a news story, an image, a video, a contact for another user, a social media post, a representation of an audio file, a playlist, a group of people, a 3D model, or any other file or data item.

Virtual objects can be displayed at defined positions in the artificial reality environment. Virtual objects can have, for example, three dimensional coordinates within the artificial reality environment. As the user of the XR device looks around the artificial reality environment, the user can view the virtual objects at these three-dimensional coordinates.

In some implementations, the user can interact with the virtual objects within the artificial reality environment. For example, the user can use one or more different gestures to move the virtual objects to new coordinates within the artificial reality environment, open a content item for display in the artificial reality environment, or remove the virtual object from the artificial reality environment. Different gestures can be associated with different controls. For example, a drag and drop gesture can be used to move a virtual object from one location to a new location in the artificial reality environment. In another example, a wiping or swiping gesture can be used to delete a virtual object, stop display of the virtual object, or turn the virtual object semi-transparent. A second wiping or swiping motion (e.g., in the opposite direction) can then restore the virtual object.

Using a gesture, the user can select a virtual object for interaction. In some implementations, to select the virtual object, the user can hold his or her hand outward "over" the object in the artificial reality environment to select the virtual object. In other implementations, the user can "tap" the virtual object, "double tap the virtual object," "grab" the virtual object, or perform some other gesture to interact with the virtual object. In yet other implementations, the user can select a virtual object with her eye gaze (tracked by the XR device), e.g. by hovering her gaze on the virtual object for a set time or performing another input when her gaze is on the intended virtual object. The XR device identifies the user selection and determines an associated virtual object.

At block 804, process 800 identifies a user selection of a non-XR device as a destination for the selected virtual object. Much like identifying the selection of the virtual object at block 802, the XR device can detect a selection of the non-XR device based on one or more user inputs, such as gestures, gaze, or voice inputs. For example, the selection can include the user performing an "air tap" on the non-XR device, moving the virtual object selected at block 802 to intersect with the non-XR device, pointing a ray at the non-XR device, saying a voice command identifying the non-XR device, etc.

In some implementations, as described above in relation to FIG. 5, the XR device can track one or more non-XR devices via a registration process. By tracking the one or more non-XR devices, positions of the one or more non-XR devices can be determined within the artificial reality environment. The position of the one or more non-XR devices can be compared to one or more positions of the user selection at block 804 to determine if the gesture is directed to one of the non-XR devices. For example, a user can select a virtual object by pointing at the virtual object in the artificial reality environment. Next, the user can move his or her hand to overlap with a position of a non-XR device in the artificial reality environment. Based on the position of the user's hand at the end of the gesture, the XR device determines if a non-XR device's position is the same position as the end of the gesture or is within a threshold distance of the end of the gesture. If the end of the gesture is at the same position or within a threshold distance from the position of the non-XR device, the non-XR device is identified as the selection.

In some implementations, the gesture performed by the user to select the non-XR device can be a continuation of a gesture used to select the virtual object. For example, the user can point his or her hand at the virtual object. Then, the user can drag the virtual object to the position of the non-XR device to "drop" the virtual object at the position of the non-XR device. The "dropping" motion selects the non-XR device.

In other implementations, the gesture performed by the user to select the non-XR device is a separate gesture from the gesture used to select the virtual object. For example, the user can "tap" a virtual object in the artificial reality environment to select the virtual object. Then, the user can "tap" the non-XR device in the artificial reality environment to select the non-XR device.

At block 806, process 800 provides an identifier of a content item associated with the selected virtual object to the selected non-XR device. Using a communication channel set up during a registration process of the non-XR device with the XR device, the content item or an identifier of the content item associated with the virtual object is transmitted by the XR device to the non-XR device. For example, the identifier of the content item can be a URL, access code, hyperlink, database entry, or other identifier of a content item that can allow the non-XR device to access a data source the content item. The data source can be a web page, a server, a database, or another data storage location that contains the content item. In some implementations, the indication includes one or more permissions or codes for the non-XR device to use to access the content item. For example, the permissions can include a password that allows the non-XR device to access a database requiring the password, the database containing the content item.

Providing the content item or content item identifier to the non-XR device can cause the non-XR device to display or otherwise output the content item. In some implementations, the non-XR device can have rules establishing how it reacts to types of received content items. For example, the non-XR device can receive the identifier of a video call and can evaluate a rule that instructs the non-XR device to access a data source of the video call and then begin participating in the video call at the non-XR device. In another example, the non-XR device can receive a URL for a web page containing a news article and can evaluate a rule that instructs the non-XR device to access the web page using a web browser of the non-XR device and display the news article on the non-XR device in a window of the web browser. Corresponding rules can be setup for multiple different types of content items, such as rules to open a social media site when the content item is a social media post, to initiate a communication session with a given application when the content item is a user contact, to play a video, etc. In some implementations, the rules can include defaults—such as a default rule to open a content item using an application mapped to the content item type in the OS of the non-XR device when no other rule applies.

In some implementations, the non-XR device can display the content item based on the location input used to select the non-XR device. For example, the XR device can determine a location of the input within the artificial reality environment as offsets (e.g., by an X and Y amount) from an lower left corner of the display of the non-XR device The XR device can provide these offsets to the non-XR device with the content item or content item identifier. Thus the non-XR device can receive a position of the endpoint of the gesture with the indication of the content item. In some implementations, the non-XR device can evaluate one or more rules associated with the corresponding location on the display to output the content item with particular parameters. For example, if the location corresponding to the endpoint of the gesture is on a left side of the display of the non-XR device, the non-XR device can determine, using the one or more rules, to display the content item in a window only on the left side of the display. In another example, the non-XR device OS can have pre-defined rules or mappings of how to handle types of content item when "dropped" (as determined based on the provided location information) onto particular other objects. For example, if the content item is dropped onto a graphical representation of a particular software application (e.g., an icon or open window for the software application), such as a media player, the non-XR device can determine, using the one or more rules, to open the content item with that software application. In a further example, if the content item is dropped on another content item that is being displayed, the non-XR device can determine, using the one or more rules, to embed the new content item in the content item already being displayed.

More details regarding the display of content items on non-XR devices can be found below in relation to FIGS. 10A-10C and 11A-11D.

Figure 9A:
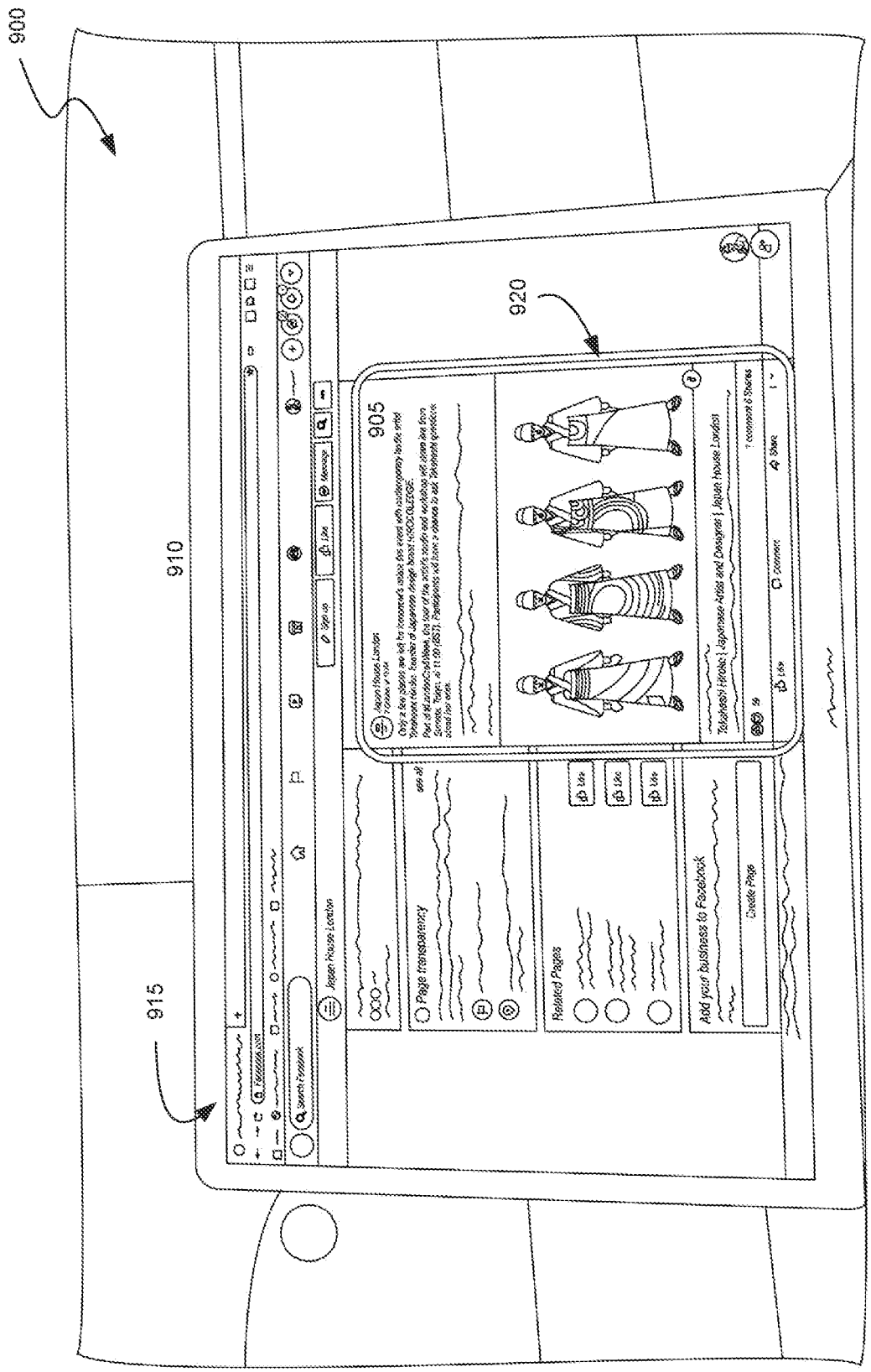
FIGS. 9A-9C are conceptual diagrams illustrating examples of displaying a content item in an artificial reality environment on an XR device.

FIG. 9A is a conceptual diagram illustrating an example 900 of identifying a content item 905 while the user is using an XR device. The user of the XR device is looking with the XR device at a non-XR device 910, which is displaying content item 905 (in this example, a news article) in a web page 915. The user of the XR device can then gesture at the content item 905 to select the content item, as described with regards to block 604 of FIG. 6. In the example 900, an outline 920 is generated by the XR device in the artificial reality environment of the XR device to indicate to the user that the content item 905 has been selected.

Figure 9B:
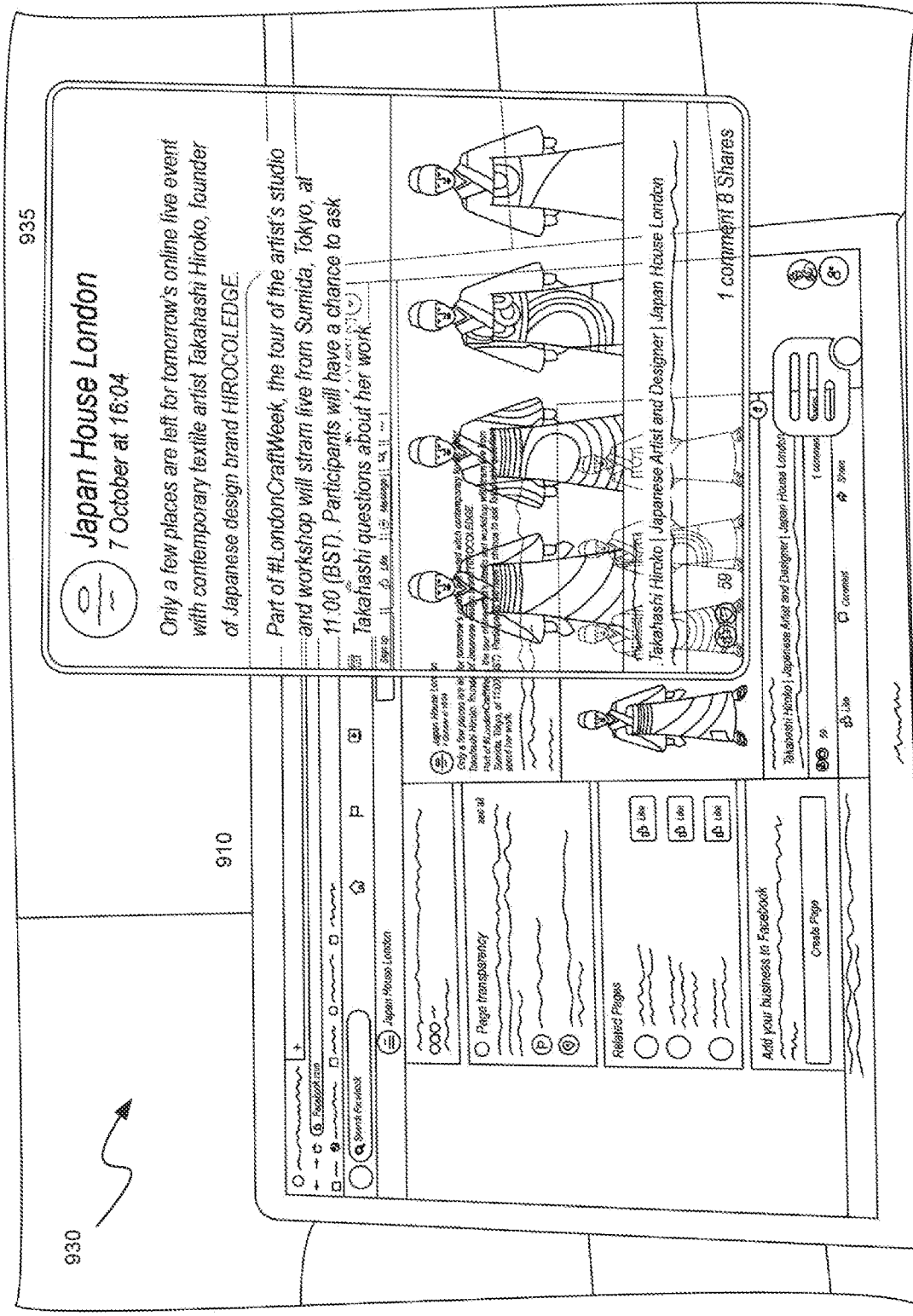

FIG. 9B is a conceptual diagram illustrating an example 930 of a virtual object 935 representing a content item being created in an artificial reality environment. After the content item 905 in example 500 was selected, the XR device generated virtual object 935, which is associated with the content item 905. As shown in example 930, the virtual object 935 can include a title of an article, a source of an article, a lead of an article, an image associated with an article, and the like. The virtual object 935 can be semi-transparent while still located "in front of" a display of the non-XR device 910.

Figure 9C:
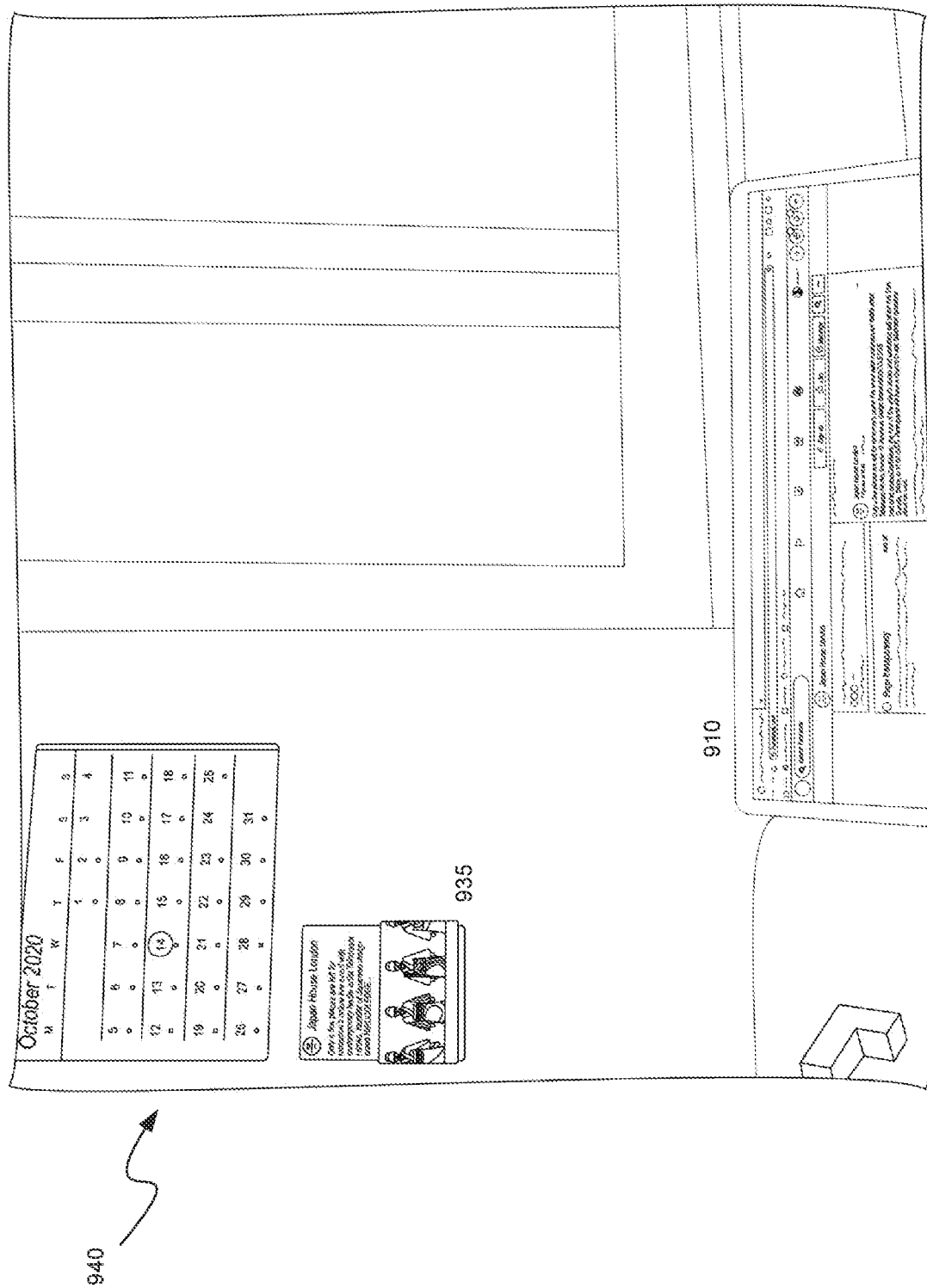

FIG. 9C is a conceptual diagram illustrating an example 940 of virtual object 935 representing content item 905 being displayed in an artificial reality environment. After the virtual object 935 is created, the virtual object 935 can optionally be repositioned manually by the user of the XR device in the artificial reality environment using a gesture or can automatically be repositioned away from the display of the non-XR device 910. As shown in example 940, the virtual object 935 can be repositioned within the artificial reality environment away from the non-XR device 910, such as by being attached to a wall surface. The virtual object 935 still displays the information obtained when it was created based on the content item 905, such as article title, image associated with the article, and the like.

Figure 10A:
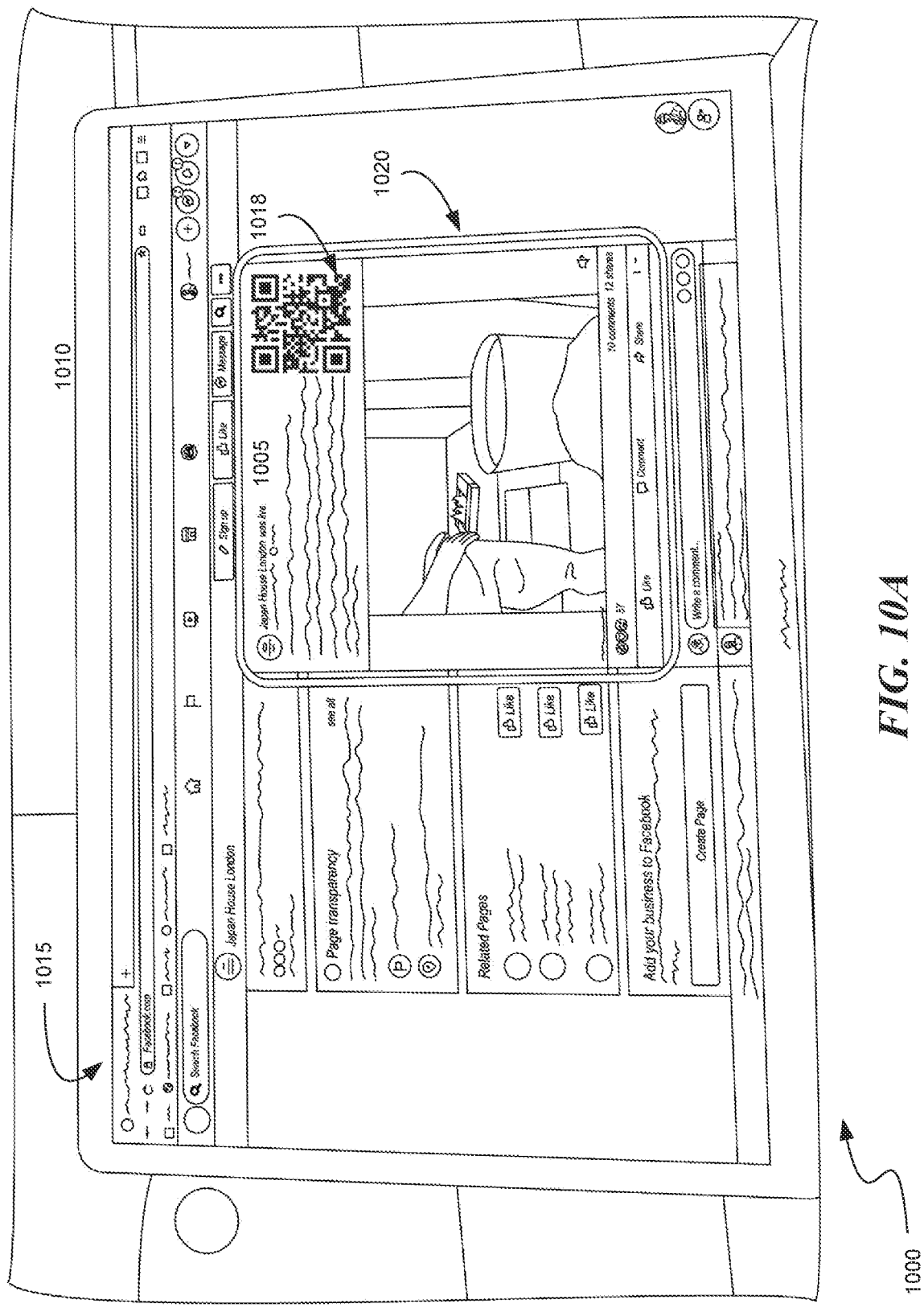
FIGS. 10A-10C are conceptual diagrams illustrating examples of displaying a content item on a non-XR device.

FIG. 10A is a conceptual diagram illustrating an example 1000 of identifying a content item 1005 while a user is using an XR device. The user of the XR device is looking with the XR device at a non-XR device 1010, which is displaying content item 905 (in this example, a news article) in a web page 1015. Due to a registration process for the non-XR device 1010, non-XR device 1010 displays content items with codes, such as QR code 1018. When the user of the XR device gestures at the content item 905 to select the content item 1005, as described with regards to block 604 of FIG. 6, the XR device obtains the content items 1005 by recognizing the QR code 1018 in the vicinity of the gesture and retrieving it from the URL indicated by the QR code 1018. In the example 1000, an outline 1020 is generated by the XR device in the artificial reality environment of the XR device to indicate to the user that the content item 1005 has been selected.

Figure 10B:
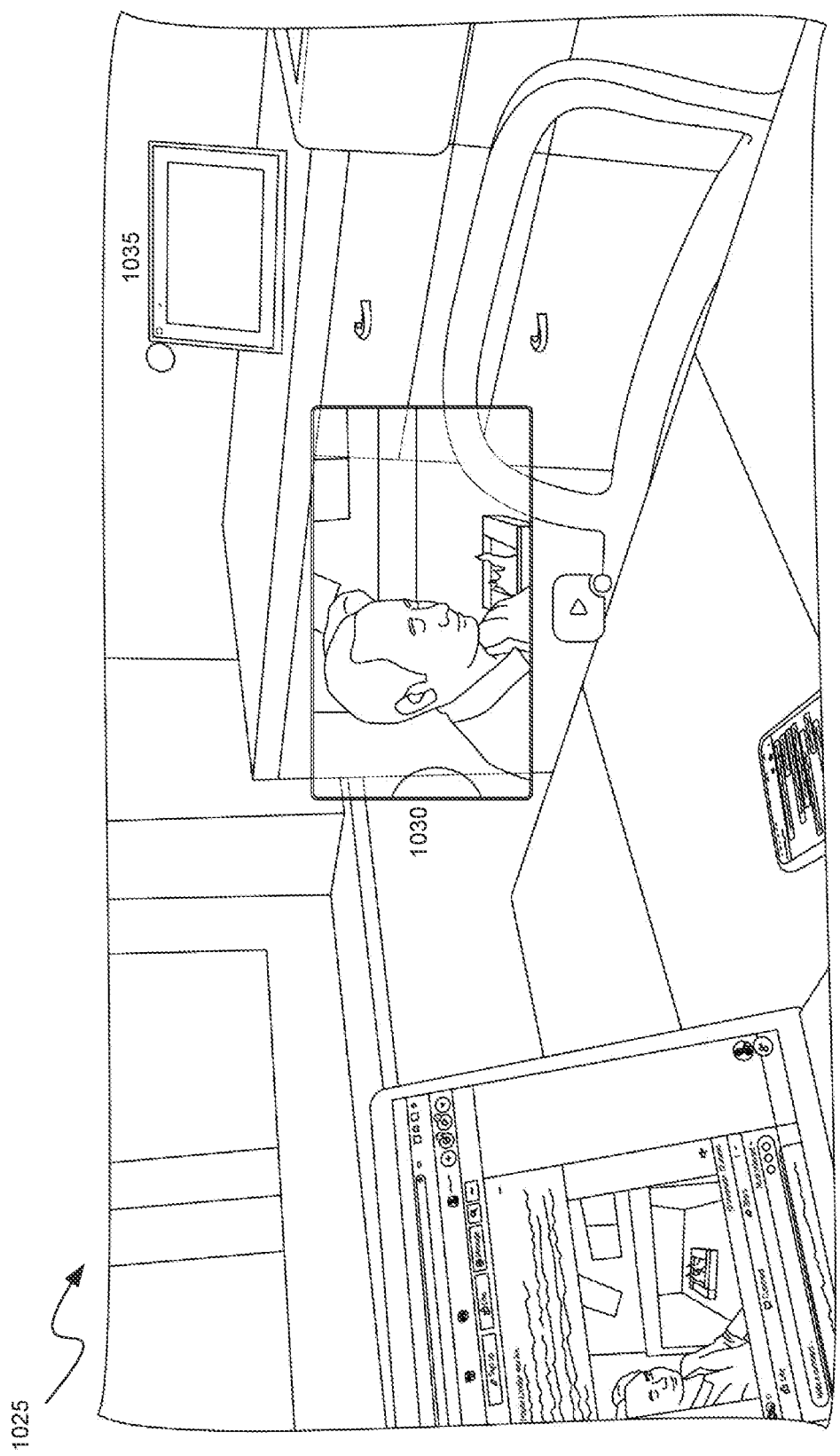

FIG. 10B is a conceptual diagram illustrating an example 1025 of creating, in an artificial reality environment, a virtual object 1030 representing content item 1005. After the content item 1005 is selected and retrieved, the XR device generates virtual object 1030 from the content item. As shown in example 1025, the virtual object 1030 can be a panel showing a video (e.g., the content item 1005). The virtual object 1030 is then displayed in the artificial reality environment.

A second non-XR device 1035 can be present in the vicinity of the user and be detectable in the artificial reality environment. In example 1025, the user can perform a gesture to interact with the virtual object 1030 to move the virtual object 1030 to overlap with the second non-XR device 1035. This gesture can indicate to the XR device to send an identifier of the content item 1005, associated with the virtual object 1030, to the second non-XR device 1035.

Figure 10C:
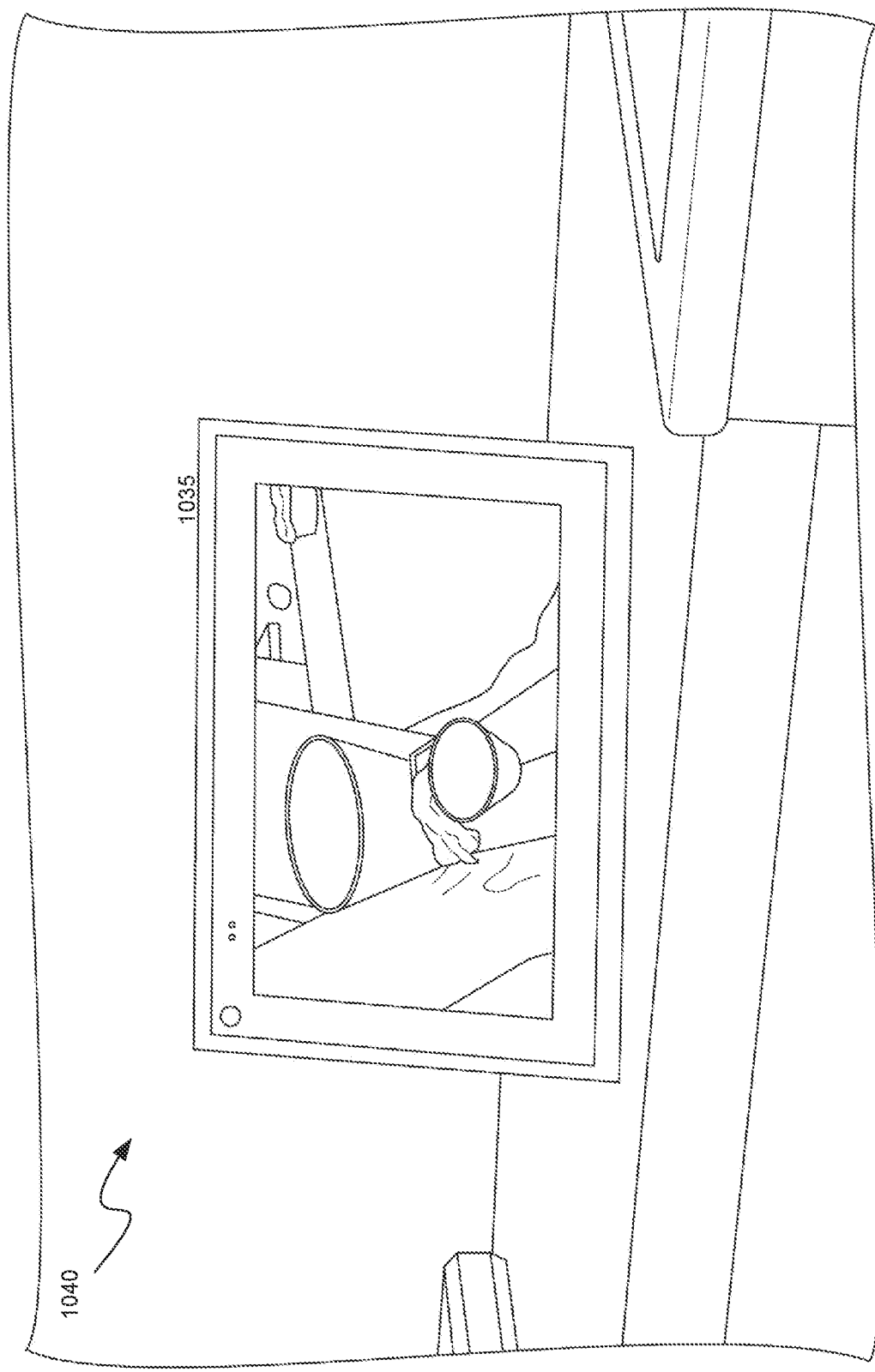

FIG. 10C is a conceptual diagram illustrating an example 1040 of displaying the content item 1005 at the second non-XR device 1035. After the user of the XR device completes a gesture and an indicator of the content item 1005 associated with the virtual object is sent to the second non-XR device 1035, the second non-XR device 1035 displays the content item 1005. For example, the second non-XR device 1035 uses the identifier of the content item to access the content item 1005 (in this case, a video) and then begins displaying the content item on a display of the second non-XR device 1035. In some implementations, if the video has already begun playing (e.g., on the non-XR device), the identifier of the content item can include a frame or timestamp of the video. When the second non-XR device 1035 begins displaying the video, the second non-XR device 1035 can start playback of the video at the frame or timestamp to ensure a seamless transition between display of the video on the non-XR device and display of the video on the second non-XR device 1035.

Figure 11A:
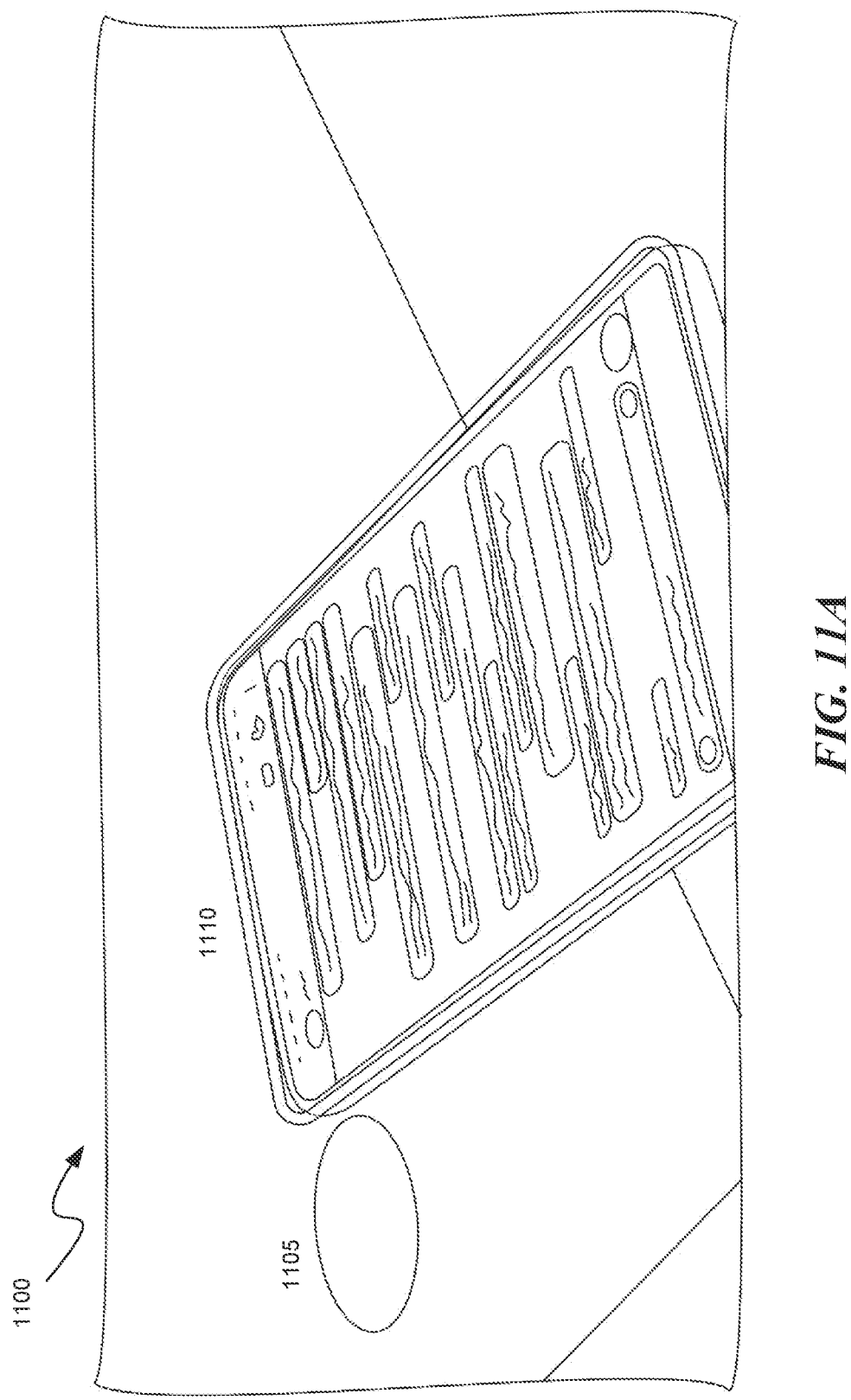
FIGS. 11A-11D are conceptual diagrams illustrating examples of displaying a content item on a non-XR device by accessing one or more content item identifiers.

FIG. 11A is a conceptual diagram illustrating an example 1100 of a virtual object 1105 representing a content item identifier being displayed in an artificial reality environment of an XR device. A non-XR device 1110 broadcasts a signal to the XR device to display the virtual object 1105 in the artificial reality environment. In some implementations, the signal indicating to display the virtual object 1105 is broadcast in response to a triggering condition, such as the non-XR device 1110 receiving a video call.

The user of the XR device can interact with the virtual object 1105 to obtain the content item identifier associated with the virtual object. For example, the user of the XR device can perform a gesture to place a hand over the virtual object 1105, which can select the virtual object 1105 and obtain the content item identifier.

Figure 11B:
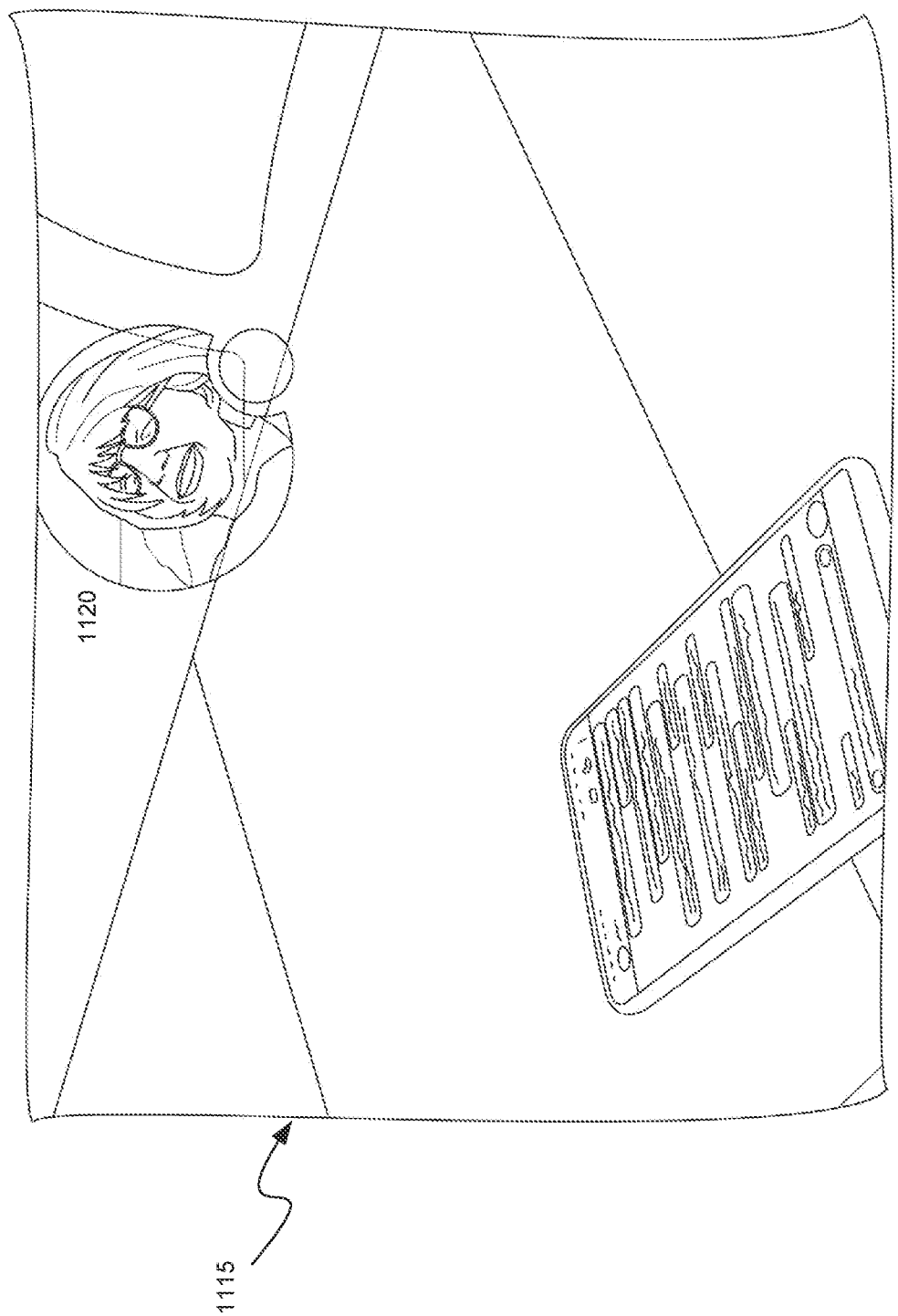

FIG. 11B is a conceptual diagram illustrating an example 1115 of a second virtual object 1120 being displayed in the artificial reality environment. After the XR device identifies a content item associated with the content item identifier represented by the virtual object 1105, the XR device creates the second virtual object 1120 and displays the second virtual object 1120. In example 1115, the second virtual object 1120 is related to a video call. The second virtual object 1120 can be a profile picture associated with a participant of the video call.

The user can interact with the second virtual object 1120 by performing a gesture in the artificial reality environment. For example, the user can use a gesture to move the position of the second virtual object 1120 in the artificial reality environment.

Figure 11C:
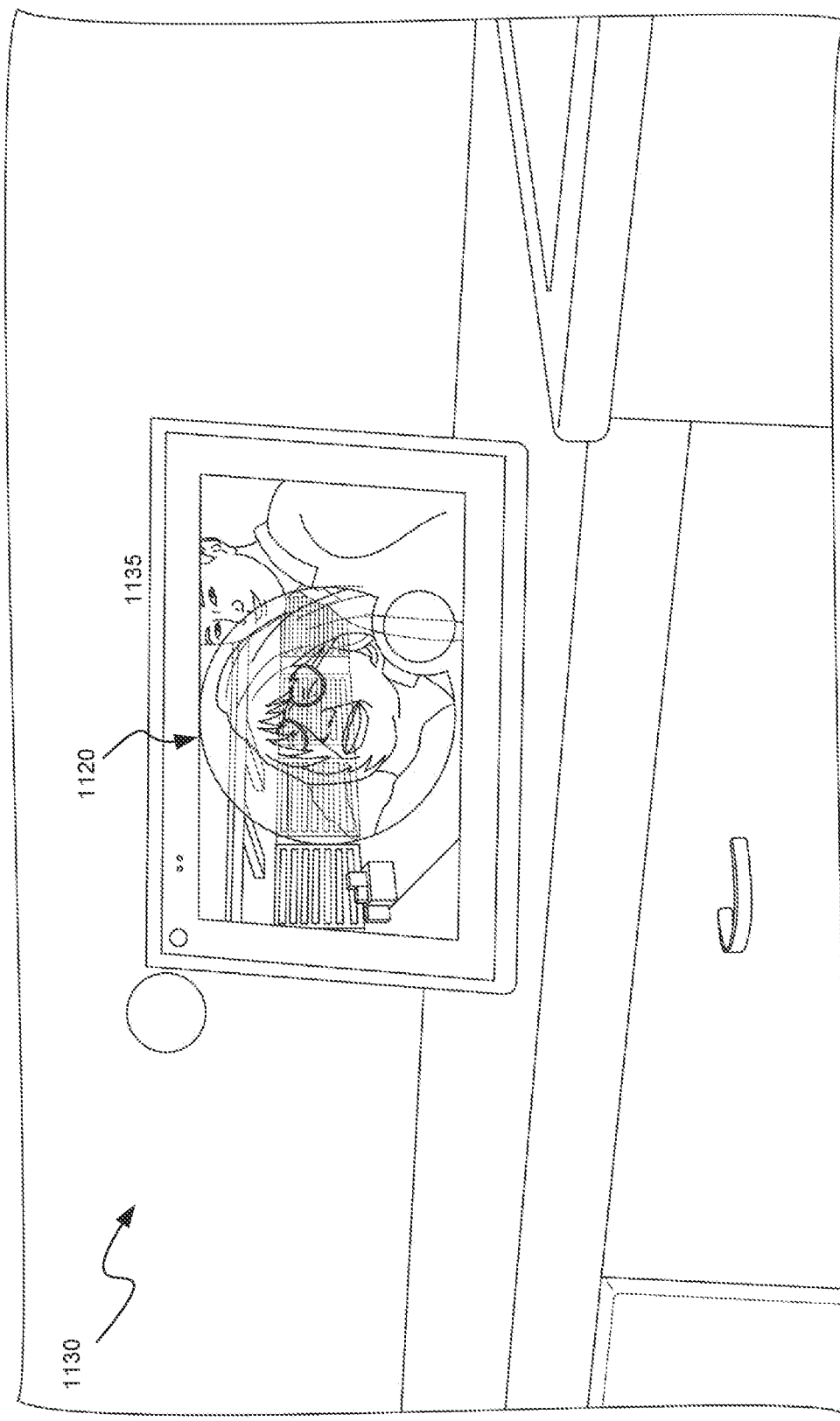

FIG. 11C is a conceptual diagram illustrating an example 1130 of providing an indicator of the content item associated with the second virtual object 1120 to a second non-XR device 1135. In example 1130, the user of the XR device uses a gesture to move the second virtual object 1120 to overlap with a position of the second non-XR device 1135 in the artificial reality environment. When the position of the second virtual object 1120 overlaps with the position of the second non-XR device 1135, an identifier of the content item represented by the second virtual object 1120 is provided by the XR device to the second non-XR device 1135.

Figure 11D:
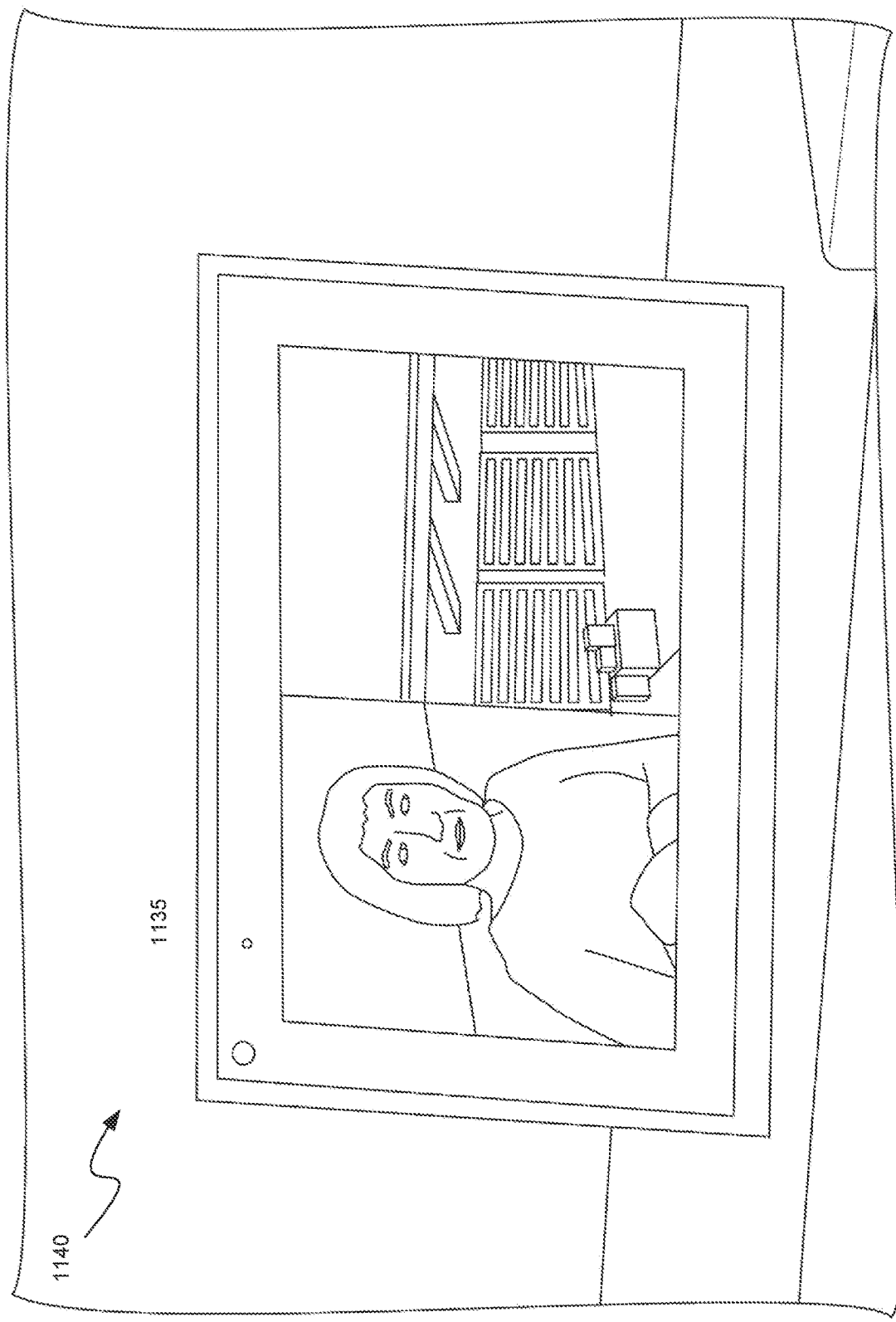

FIG. 11D is a conceptual diagram illustrating an example 1140 of the second non-XR device 1135 displaying the content item associated with the second virtual object. After receiving the identifier of the content item, the second non-XR device 1135 accesses the content item (for example, from a server) and displays the content item. In example 1140, the second non-XR device 1135 is already displaying a content item. Using one or more rules associated with the position of the second virtual object in relation to the second non-XR device 1135, the second non-XR device 1135 determines that the content item associated with the second virtual object 1120 (e.g., the video call) should be displayed on a left side of a display of the second non-XR device.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for displaying a virtual object on an XR device, the method comprising:
    creating registration between A) the XR device, and B) a first non-XR device and a second non-XR device, wherein creating registration between the XR device and the first non-XR device comprises creating a first communication channel between the XR device and the first non-XR device, wherein creating registration between the XR device and the second non-XR device comprises creating a second communication channel between the XR device and the second non-XR device, and wherein no direct communication channel is created between the first and second non-XR devices;
    identifying, based on a first user input to the XR device, a selection of the first non-XR device;
    using the first communication channel created during registration to transfer, to the XR device, one or more content items, associated with the first non-XR device and indicated by the first user input;
    creating a virtual object associated with each of the one or more identified content items;
    displaying, by the XR device, the virtual object associated with each of the one or more identified content items in an artificial reality environment associated with the XR device; and
    sending, by the XR device to the second non-XR device, the one or more identified content items associated with the virtual object, without direct communication between the first and second non-XR devices,
    wherein the sending causes display, by the second non-XR device, of the one or more identified content items associated with the virtual object.

2. The method of claim 1, wherein identifying the selection of the first non-XR device includes detecting a gesture of a user of the XR device directed toward the first non-XR device.

3. The method of claim 1, wherein identifying the selection of the first non-XR device includes selecting an audio output hardware device or selecting a virtual object displayed in the artificial reality environment associated with a detected audio output of the first non-XR device.

4. The method of claim 1, the method further comprising:
    receiving the one or more identified content items at the XR device, sent from the first non-XR device over the first communication channel.

5. The method of claim 1, wherein the one or more content items are identified by:
    detecting a second user gesture directed to the first non-XR device within the artificial reality environment; and
    identifying a point on a screen of the first non-XR device, the point associated with the user gesture;
    wherein an indication of the point is transmitted, by the XR device to the first non-XR device over the first communication channel,
    wherein the first non-XR device identifies the one or more content items being output by the first non-XR device and associated with the point; and
    wherein the identifying the one or more content items associated with the first non-XR device comprises receiving, from the first non-XR device over the first communication channel, the one or more identified content items associated with the point or identifiers for the one or more content items associated with the point.

6. The method of claim 5, wherein the first non-XR device identifies the one or more content items by:
    identifying two or more embedded content items associated with the point, with at least one of the two or more embedded content items embedded within another of the two or more embedded content items;
    accessing one or more rules defining a hierarchy of content item types and/or content item levels; and
    evaluating the one or more accessed rules to:
        select one of the one or more of content embedded content items as the one or more content items.

7. A computing system for transferring a content item to an XR device as a virtual object, the computing system comprising:
    one or more processors, and
    one or more memories storing instructions that, when executed by the one or more processors, cause the computing system to perform a process comprising:
        creating registration between A) the XR device and B) a first non-XR device and a second non-XR device, wherein creating registration between the XR device and the first non-XR device comprises creating a first communication channel between the XR device and the first non-XR device, wherein creating registration between the XR device and the second non-XR device comprises creating a second communication channel between the XR device and the second non-XR device, and wherein no direct communication channel is created between the first and second non-XR devices, wherein the registration causes the one or more content item identifiers to be displayed in the artificial reality environment when the XR device is in communicative contact with the first and second non-XR devices over the first and second communication channels;
        identifying a location of a user selection within an artificial reality environment of the XR device;
        identifying one or more content item identifiers A) displayed relative to a corresponding content item on the first non-XR device and B) that is in relation to the location of the user selection, wherein each of the one or more content item identifiers includes a QR code associated with the corresponding content item;
        obtaining the corresponding content item based on the one or more content item identifiers, wherein obtaining the corresponding content item includes retrieving the corresponding content item from the first non-XR device based on the associated QR code;
        creating a virtual object associated with the obtained content item; and
        displaying, by the XR device, the virtual object in the artificial reality environment of the XR device.

8. The computing system of claim 7, wherein the QR code specifies a source of the content item.

9. The computing system of claim 7, wherein the QR code includes a URL associated with the content item.

10. The computing system of claim 7, wherein identifying the content item further comprises capturing an image of the content item and applying image recognition or image matching technologies to the captured image.

11. A computer-readable storage medium storing instructions that, when executed by one or more processors, cause the one or more processors to perform a process, the process comprising:
creating registration between A) the XR device and B) a first non-XR device and a second non-XR device, wherein creating registration between the XR device and the first non-XR device comprises creating a first communication channel between the XR device and the first non-XR device, wherein creating registration between the XR device and the second non-XR device comprises creating a second communication channel between the XR device and the second non-XR device, and wherein no direct communication channel is created between the first and second non-XR devices;
identifying a selection of a virtual object, displayed in an artificial reality environment of the XR device, associated with a content item retrieved from the first non-XR device over the first communication channel;
identifying a selection of the second non-XR device; and
using the second communication channel to send the content item associated with the selected virtual object to the second non-XR device;
wherein the sending of the content item to the second non-XR device causes display by the second non-XR device of the content item on a display of the second non-XR device.

12. The computer-readable storage medium of claim 11, wherein identifying the selection of the virtual object and identifying the selection of the second non-XR device includes identifying a gesture of a user of the XR device in relation to the virtual object and the second non-XR device.

13. The computer-readable storage medium of claim 12, wherein the gesture is a drag-and-drop gesture of a graphical representation of the virtual object within the artificial reality environment of the XR device.

14. The computer-readable storage medium of claim 13, wherein the drag-and-drop gesture includes moving the virtual object to be positioned relative to the second non-XR device.

15. The computer-readable storage medium of claim 11, wherein the process further comprises:
transmitting an identifier of the virtual object to the second non-XR device from the XR device over the second communication channel.

16. The computer-readable storage medium of claim 11, wherein the identifier of the virtual object includes a QR code, and wherein causing the second non-XR device to display a content item comprises:
causing the second non-XR device to access the content item using the QR code.

17. The computer-readable storage medium of claim 11, wherein sending the content item to the second non-XR device includes:
identifying a gesture of a user directed at the second non-XR device;
identifying an endpoint of the gesture within the artificial reality environment;
access one or more rules associated the endpoint of the gesture; and
based on the one or more accessed rules,
causing the second non-XR device to display the content item associated with the selected virtual object according to the one or more accessed rules.

18. The computer-readable storage medium of claim 17, wherein the one or more rules are accessed by:
identifying a location within the artificial reality environment of the endpoint of the gesture;
identifying a point on a screen of the second non-XR device associated with the location of the endpoint; and
accessing the one or more rules based on the point on the screen associated with the location of the endpoint.

\* \* \* \* \*